US012804207B2

(12) United States Patent
Yu et al.

(10) Patent No.: US 12,804,207 B2
(45) Date of Patent: Nov. 17, 2026

(54) VIDEO CODING METHOD AND APPARATUS, ELECTRONIC DEVICE, STORAGE MEDIUM, AND PROGRAM PRODUCT

(71) Applicant: Tencent Technology (Shenzhen) Company Limited, Shenzhen (CN)

(72) Inventors: Shuang Yu, Shenzhen (CN); Zhiqiang Cao, Shenzhen (CN); Yuwei Wang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 19/095,655

(22) Filed: Mar. 31, 2025

(65) Prior Publication Data

US 2025/0280158 A1 Sep. 4, 2025

Related U.S. Application Data

(63) Continuation of application No. PCT/CN2024/079845, filed on Mar. 4, 2024.

(30) Foreign Application Priority Data

Mar. 6, 2023 (CN) ......................... 202310254402.3

(51) Int. Cl.
*H04N 19/96* (2014.01)
*H04N 19/436* (2014.01)

(52) U.S. Cl.
CPC ........... *H04N 19/96* (2014.11); *H04N 19/436* (2014.11)

(58) Field of Classification Search
None
See application file for complete search history.

(56) References Cited

U.S. PATENT DOCUMENTS

| | | | | |
|---|---|---|---|---|
| 10,127,624 | B1 | 11/2018 | Lassahn et al. | |
| 10,291,925 | B2 | 5/2019 | Holland et al. | |
| 2018/0089000 | A1* | 3/2018 | Ryu | H04N 19/127 |
| 2019/0037227 | A1* | 1/2019 | Holland | H04N 19/43 |

(Continued)

FOREIGN PATENT DOCUMENTS

| | | | |
|---|---|---|---|
| CN | 106686380 | A | 5/2017 |
| CN | 110677646 | A | 1/2020 |

(Continued)

OTHER PUBLICATIONS

International Search Report of PCT/CN2024/079845 dated May 31, 2024 [PCT/ISA/210].

(Continued)

*Primary Examiner* — Edemio Navas, Jr.
(74) *Attorney, Agent, or Firm* — Sughrue Mion, PLLC

(57) ABSTRACT

A video coding method and apparatus including acquiring an image, partitioning the image into a plurality of coding tree units (CTUs), each CTU including one or more coding units (CUs), distributing coding tasks of coding blocks of CUs in a plurality of CTU rows in the image into a plurality of task sequences, each task sequence being a sequence of coding tasks of a plurality of coding blocks, and executing the plurality of task sequences in parallel to obtain coding results for the coding blocks of the CUs in the plurality of CTU rows.

16 Claims, 13 Drawing Sheets

(56) References Cited

U.S. PATENT DOCUMENTS

| | | | | |
|---|---|---|---|---|
| 2023/0119972 A1* | 4/2023 | Tsai | ........................ | H04N 19/42<br>375/240.02 |
| 2024/0080484 A1* | 3/2024 | Francois | ................ | H04N 19/70 |

FOREIGN PATENT DOCUMENTS

| | | |
|---|---|---|
| CN | 113259675 A | 8/2021 |
| CN | 116980616 A | 10/2023 |

OTHER PUBLICATIONS

Written Opinion of PCT/CN2024/079845 dated May 31, 2024 [PCT/ISA/237].

European Search Report issued Apr. 15, 2026 in EP Application No. 24766397.4.

Zhang Yuanzhi et al: "Efficient Algorithm Adaptations and Fully Parallel Hardware Architecture of H.265/HEVC Intra Incoder", IEEE Transactions on Circuits and Systems for Video Technology, vol. 29, No. 11, Nov. 2019, pp. 3415-3429. (15 pages).

* cited by examiner

VIDEO CODING METHOD AND APPARATUS, ELECTRONIC DEVICE, STORAGE MEDIUM, AND PROGRAM PRODUCT

CROSS-REFERENCE TO RELATED APPLICATIONS

This application is a continuation application of International Application No. PCT/CN2024/079845 filed on Mar. 4, 2024, which claims priority to Chinese Patent Application No. 2023102544023 filed with the China National Intellectual Property Administration on Mar. 6, 2023, the disclosures of each being incorporated by reference herein in their entireties.

FIELD

The disclosure relates to the technical field of image processing, more specifically video coding method and apparatus, an electronic device, a storage medium, and a program product.

BACKGROUND

In high efficient video coding (HEVC), mode decision (MD) is the most important core module that determines the coding quality and the coding efficiency. In MD, a to-be-processed image is coded through operations such as prediction (Pred), transform and quantization (TQ), and rate distortion optimization (RDO).

In the related art, the largest coding unit (LCU) is usually used as a coding unit (CU), and each LCU in the to-be-processed image is sequentially coded in the grating coding order. For example, referring to FIG. 1, each space represents one LCU, and for each row of LCUs, the LCUs are coded in a left-to-right sequence.

An LCU may include one or more CUs. In the process of coding each LCU, each CU will be processed in the order of Pred→TQ→RDO. For example, referring to FIG. 2, Pred, TQ, and RDO processing are sequentially performed on a luminance component and a chrominance component of a CU0, and after coding of the CU0 is completed, Pred, TQ, and RDO processing are sequentially performed on a CU1.

However, if coding is performed in the grating coding order, processing on only one LCU is started each time, but the processing of the next CU needs to be performed after the Pred, TQ, and RDO processing of the previous CU is completed, resulting in low resource utilization and long data processing time, which further causes a waste of computing and storage resources.

SUMMARY

Some embodiments provide a video coding method, performed in an electronic device, the method including: acquiring an image; partitioning the image into a plurality of coding tree units (CTUs), each CTU including one or more coding units (CUs); distributing coding tasks of coding blocks of CUs in a plurality of CTU rows in the image into a plurality of task sequences, each task sequence being a sequence of coding tasks of a plurality of coding blocks; and executing the plurality of task sequences in parallel, so as to obtain coding results for the coding blocks of the CUs in the plurality of CTU rows.

Some embodiments provide a video coding apparatus, including: at least one memory configured to store computer program code; and at least one processor configured to read the program code and operate as instructed by the program code, the program code comprising: acquisition code configured to cause at least one of the at least one processor to acquire an image; partitioning code configured to cause at least one of the at least one processor to partition the image into a plurality of coding tree units (CTUs), each CTU comprising one or more coding units (CUs); scheduling code configured to cause at least one of the at least one processor to distribute coding tasks of coding blocks of CUs in a plurality of CTU rows in the image into a plurality of task sequences, each task sequence being a sequence of coding tasks of a plurality of coding blocks; and encoding code configured to cause at least one of the at least one processor to execute the plurality of task sequences in parallel, so as to obtain coding results for the coding blocks of the CUs in the plurality of CTU rows.

Some embodiments provide a non-transitory computer-readable storage medium, storing computer code which, when executed by at least one processor, causes the at least one processor to at least: acquire an image; partition the image into a plurality of coding tree units (CTUs), each CTU comprising one or more coding units (CUs); distribute coding tasks of coding blocks of CUs in a plurality of CTU rows in the image into a plurality of task sequences, each task sequence being a sequence of coding tasks of a plurality of coding blocks; and execute the plurality of task sequences in parallel, so as to obtain coding results for the coding blocks of the CUs in the plurality of CTU rows.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
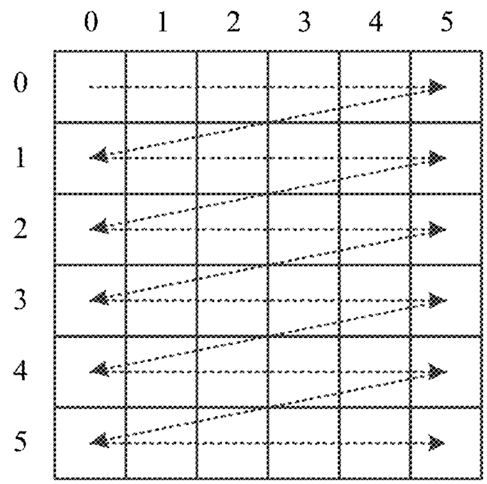
FIG. 1 is a schematic diagram of a grating coding sequence.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, the terms "first", "second", and the like are intended to distinguish between different objects but do not indicate a particular order. Besides, the terms "include" and "have" and any variations thereof are intended to cover non-exclusive inclusion. For example, a process, method, system, product, or device that includes a series of operations or modules is not limited to the listed operations or modules; and instead, further includes an operation or module that is not listed in some embodiments, or further includes another operation or module that is intrinsic to the process, method, product, or device in some embodiments.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In the following descriptions, "a plurality of" may represent at least two, for example, may be two, three, or more, and this is not limited in herein. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Some embodiments provide a video coding method and apparatus, an electronic device, a storage medium, and a program product, to improve the utilization of processing resources and improve the coding efficiency.

In some embodiments, the collection, use, and processing of map data all comply with relevant laws, regulations, and standards of relevant countries and regions.

Some relevant concepts are first explained below.

Coding tree unit (CTU): In HEVC, each frame of image may be divided into one or more CTUs of a fixed size. Each CTU may be further divided into one or more CUs through a recursive quadtree. Each leaf node of the quadtree is referred to as a CU, and a CU is a basic unit block for intra-frame or inter-frame coding.

Figure 3A:
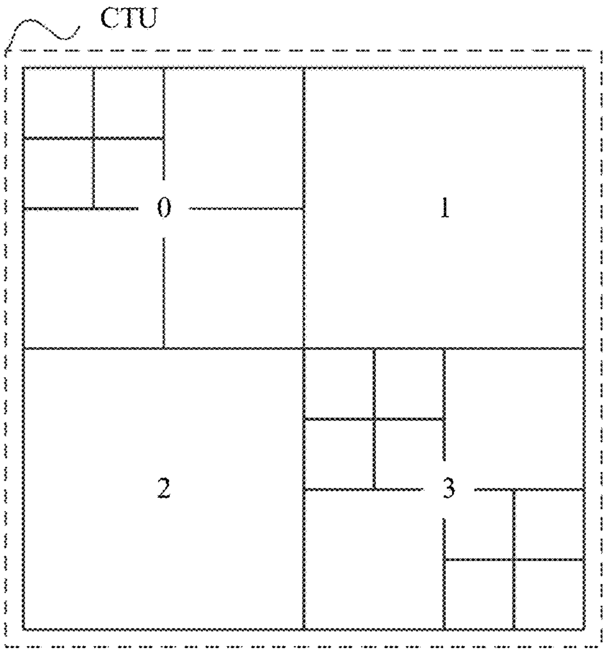
FIG. 3A is a schematic structural diagram of a CTU according to some embodiments.
Figure 3B:
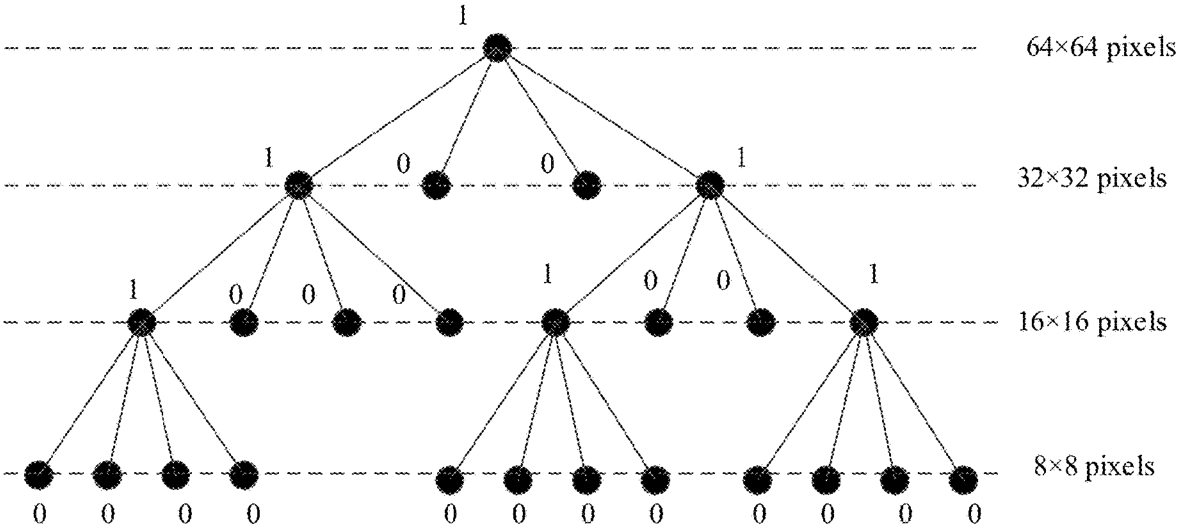
FIG. 3B is a schematic structural diagram of a quadtree corresponding to a CTU according to some embodiments.

For example, referring to FIG. 3A, each space represents one CU, and the CTU is further divided into two CUs of 32×32 pixels, five CUs of 16×16 pixels, and 12 CUs of 8×8 pixels. Referring to FIG. 3B, in the quadtree corresponding to the CTU, the root node represents the CTU, "1" represents that the current node has a child node, and "0" represents that the current node has no child node. The quadtree includes 19 leaf nodes, and each leaf node is a CU.

Largest coding unit (LCU): In an HEVC encoder, LCU is used as a CU for coding. A size of LCU is usually the same as that of CTU, such as 64×64 pixels.

Mode decision (MD): In order to obtain the final optimal division mode among many division modes of each size, an MD module is introduced. This module is generally the core processing unit of each video encoder. This implementation selects the division mode and prediction mode of the CU with the best coding performance through an RDO process for a plurality of intra-frame and inter-frame candidate modes, achieving the best coding quality and performance. The MD module is usually the module with the highest complexity and the strongest data structure dependence in the encoder. In the standard HEVC encoder, it is necessary to recursively detect all possible segmentation combinations and select the combination with the lowest rate-distortion cost as the optimal solution to achieve RDO.

The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Cloud computing is a computing mode, in which computing tasks are distributed on a resource pool formed by a large quantity of computers, so that various application systems can acquire computing power, storage space, and information services according to requirements. A network that provides resources is referred to as a "cloud". For a user, resources in a "cloud" seem to be infinitely expandable, and can be obtained readily, used on demand, expanded readily, and paid for according to usage.

As a basic capability provider of cloud computing, a cloud computing resource pool (which is referred to as a cloud platform for short, and is generally referred to as an Infrastructure as a Service (IaaS)) platform is built, and a plurality of types of virtual resources are deployed in the resource pool for external customers to choose for use. The cloud computing resource pool mainly includes: a computing device (which is a virtualized machine, including an operating system), a storage device, and a network device.

According to the division of logical functions, a Platform as a Service (PaaS) layer may be deployed on the IaaS layer, and a Software as a Service (SaaS) layer is then deployed on the PaaS layer, or SaaS may be directly deployed on IaaS. PaaS is a platform on which software runs, such as a database or a web container. SaaS is a variety of service software, such as a web portal and an SMS group sender. Generally, SaaS and PaaS are upper layers relative to IaaS.

Artificial intelligence (AI) is a theory, method, technology, and application system in which a digital computer or a machine controlled by a digital computer is used to simulate, extend, and expand human intelligence, perceive an environment, acquire knowledge, and use the knowledge to obtain an optimal result. In other words, AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making.

An AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. AI software technologies mainly include several major directions such as a computer vision (CV) technology, a speech processing technology, a natural language processing technology, and machine learning/deep learning.

Computer vision (CV) is a science that studies how to use a machine to "see", and furthermore, that uses a camera and a computer to replace human eyes to perform machine vision such as recognition, detection, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

Figure 2:
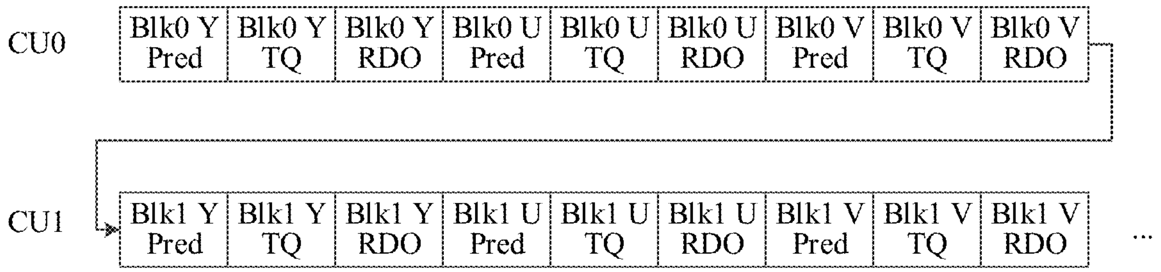
FIG. 2 is a schematic diagram of a task execution order.

In the related art, each LCU in the to-be-processed image is sequentially coded in the grating coding order. For example, referring to FIG. 1, for each row of LCUs, the LCUs are coded in a left-to-right sequence. An LCU may include one or more CUs. In the process of coding each LCU, each CU will be processed in the order of Pred→TQ→RDO. For example, referring to FIG. 2, Pred, TQ, and RDO processing are sequentially performed on a CU0, and after coding of the CU0 is completed, Pred, TQ, and RDO processing are sequentially performed on a CU1.

However, if coding is performed in the grating coding order, only one LCU is started each time, and the processing of the next CU needs to be performed after the Pred, TQ, and RDO processing of the previous CU is completed, resulting in low resource utilization and long data processing time, which further causes a waste of computing and storage resources.

In some embodiments, CU sets associated with WPP threads respectively may be first determined, a task subset corresponding to each CU including N types of tasks, and then total sets of tasks to be executed by corresponding WPP threads may be obtained; subsequently, processing resources corresponding to each task are determined based on processing resources respectively distributed to the N types; subsequently, a scheduling order of tasks in each total set of tasks is obtained based on dependency relationships between coding results for the CUs, the scheduling order supporting parallel processing of at least two WPP threads; and finally, based on the processing resources respectively corresponding to the tasks, corresponding WPP threads are called in the scheduling order to process corresponding tasks, to obtain a coding result for the to-be-processed image.

In this way, through WPP parallel processing, various tasks involved in the MD process are scheduled in a case that the coding data dependency is met, so as to make full use of computing resources, improve the coding speed, save hardware resources, and resolve the problems of hardware encoder speed and resource bottleneck in MD while ensuring the hardware coding quality and coding efficiency.

In some embodiments, an image may be first acquired; then the image may be partitioned into a plurality of CTUs, each CTU including one or more CUs; based on this, coding tasks of coding blocks of CUs in a plurality of CTU rows in the image may be distributed into a plurality of task sequences, each task sequence being a sequence of coding tasks of a plurality of coding blocks; and the plurality of task sequences may be executed in parallel, so as to obtain coding results for the coding blocks of the CUs in the plurality of CTU rows. In this way, in some embodiments, tasks of coding blocks of CUs in a plurality of CTU rows (or a plurality of LCU rows) may be processed in parallel, thereby making full use of computing resources, and improving the coding efficiency.

Figure 4:
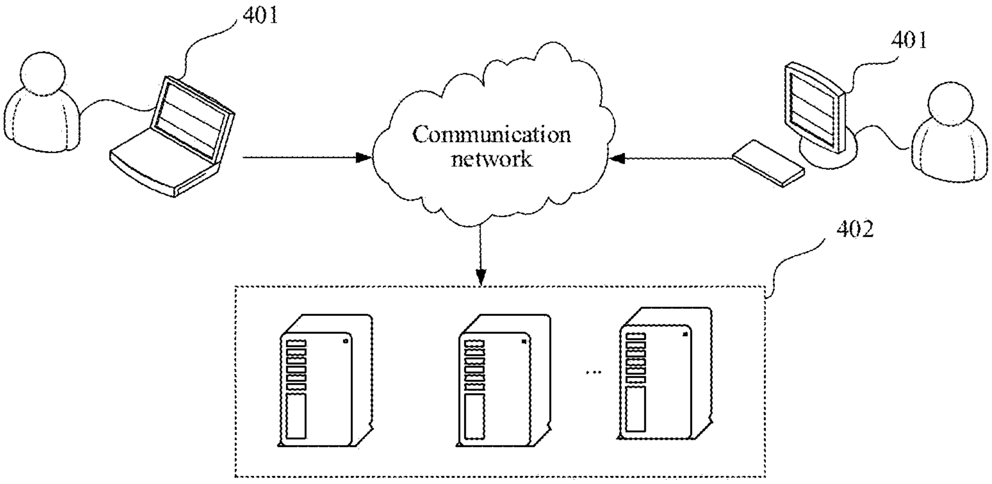
FIG. 4 is a schematic diagram of an application scenario according to some embodiments.

FIG. 4 is a schematic diagram of an application scenario according to some embodiments. The application scenario includes a terminal device 401 and a server 402.

In some embodiments, applications that require image coding, such as on-demand, live streaming, cloud gaming, cloud mobile phone, and cloud desktop are installed on the terminal device 401. The application may be a software client, or a client such as a web page or an applet.

The terminal device 401 may be a device owned by a user, such as a mobile phone, a tablet computer, a notebook computer, a desktop computer, a smart TV, a smart wearable device, a smart voice interaction device, a smart home appliance, an in-vehicle terminal, or an aircraft.

The server 402 may be a backend server corresponding to an application installed on the terminal device 401, and the server can provide a coding function. The server 402 may be, for example, an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform, but is not limited thereto.

The terminal device 401 may be communicatively connected to the server 402 directly or indirectly by using one or more networks. The network may be a wired network or a wireless network. For example, the wireless network may be a mobile cellular network, or may be a wireless-fidelity (Wi-Fi) network, and may further be other possible networks. This is not limited in herein.

In some embodiments, there may be one or more terminal devices 401. Similarly, there may be one or more servers 402. That is, the quantity of terminal devices 401 or servers 402 is not limited.

In some embodiments, after acquiring a to-be-processed image, the server 402 determines CU sets associated with created WPP threads respectively based on position information of CUs in the to-be-processed image; and performs the following operations for each WPP thread: obtaining, based on task subsets respectively corresponding to CUs in a CU set associated with a WPP thread, a total set of tasks to be executed by the WPP thread, each task subset including N types of tasks; respectively determining, based on processing resources respectively distributed to the N types, processing resources respectively corresponding to tasks included in each total set of tasks; obtaining a scheduling order of the tasks in each total set of tasks based on dependency relationships between coding results for the CUs in the to-be-processed image, the scheduling order supporting parallel processing of at least two WPP threads; and calling corresponding WPP threads to process corresponding tasks in the scheduling order based on the processing resources respectively corresponding to the tasks in the total set of tasks, to obtain a coding result for the to-be-processed image. After coding the to-be-processed data, the server 402 transmits the coded data to the terminal device 401.

In some embodiments, the video coding method may be implemented by a terminal device or a server, or may be implemented jointly by a terminal device and a server. This is not limited.

In some embodiments, the method may be applied to various application scenarios such as on-demand, ultra-high-definition real-time live streaming, cloud gaming low-latency scenarios, cloud mobile phones, and cloud desktops, and through transcoding or rendering and then coding and transmitting on the cloud, edge, or device, the CDN bandwidth is reduced, the delay is reduced, and the coding speed is improved. For image data that needs to be rendered (such as game streams), after the image data is rendered, the image data may be coded and transmitted after high-definition video processing. For image data that does not need to be rendered (such as live streaming and short videos), the image data may be decoded and then coded and transmitted after high-definition video processing.

In some embodiments, in order to meet the needs of different applications, the coding solution may be selected according to the product service requirements. For example, if the product service focuses on low latency, the coding solution may be set to a low latency mode, and each coding core perform outputting at the LCU row level, thereby coding the WPP LCU row level, and converting the WPP LCU row level into the grating LCU row level for output. In another example, if the product service focuses on the coding speed, the priority of each pipeline in 3WPP is controlled according to the service, and the coding speed is optimized by adjusting the pipeline utilization.

Figure 5:
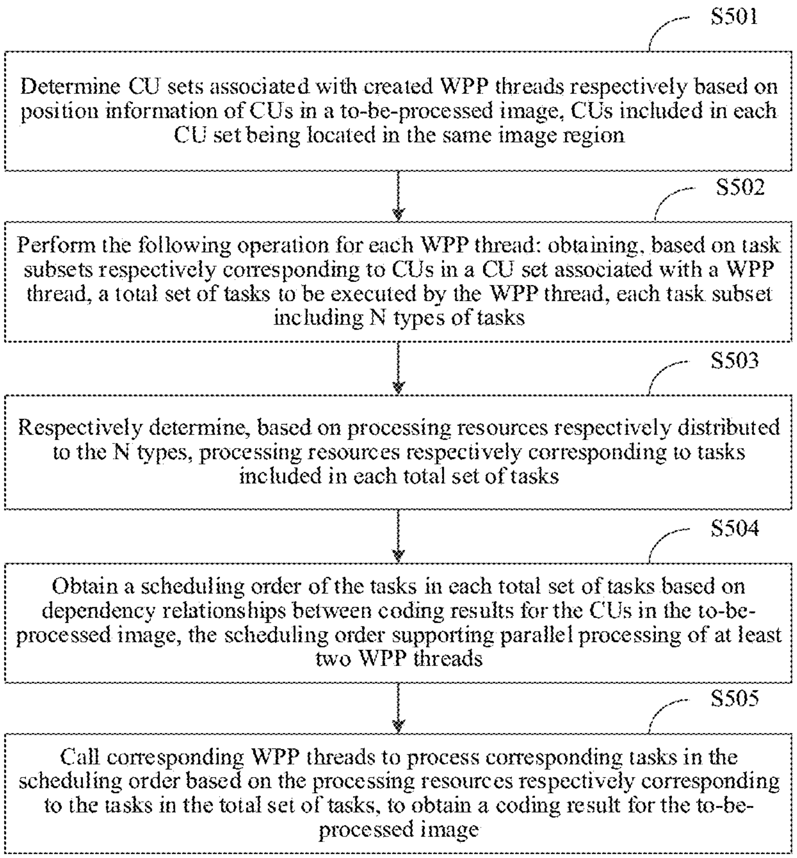
FIG. 5 is a schematic flowchart of a video coding method according to some embodiments.

FIG. 5 is a schematic flowchart of a possible video coding method according to some embodiments. The method is applied to an electronic device. The electronic device may be a terminal device or a server. The process is as follows:

S501: Determine CU sets associated with created WPP threads respectively based on position information of CUs in a to-be-processed image, CUs included in each CU set being located in the same image region. For example, CUs in each CU set belong to the same row of LCUs.

In some embodiments, the to-be-processed image includes, but not limited to, a game image, a video image, or the like. The to-be-processed image may be divided into one or more CTUs, and each CTU includes one CU (without further division) or a plurality of CUs (with further division). For example, a size of a CU ranges from the smallest CU to the CTU. Generally, the size of the CTU is 64×64 pixels, and the smallest CU is 8×8 pixels. Therefore, the size of a CU may be 8×8 pixels, 16×16 pixels, 32×32 pixels, or 64×64 pixels.

The position information of each CU is configured for representing: an LCU to which the corresponding CU belongs in the to-be-processed image. LCU is a basic unit for coding the to-be-processed image. In HEVC, a size of an LCU is usually 64×64 pixels. Therefore, in some embodiments, the LCU may be equivalent to the CTU.

For the to-be-processed image, the to-be-processed image may be divided into several non-overlapping LCUs according to a set LCU size. Each LCU may be further divided to obtain CUs.

Figure 6:
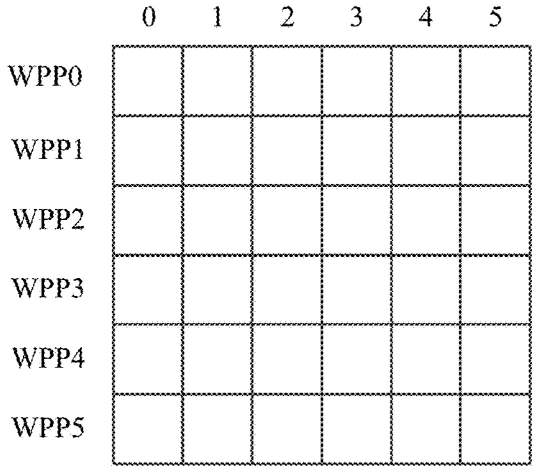
FIG. 6 is a schematic diagram of a first row of LCUs according to some embodiments.

The parallel technology of WPP is performed in units of a row of LCUs. As shown in FIG. 6, the created WPP threads include: a WPP0 thread to a WPP5 thread. Each WPP thread corresponds to one row of LCUs. One square represents one LCU. Each WPP thread performs coding for a corresponding row of LCUs. In some embodiments, based on the LCU to which each CU belongs in the to-be-processed image, CUs included in a row of LCUs corresponding to a WPP thread is used as a CU set associated with the WPP thread.

Figure 7:
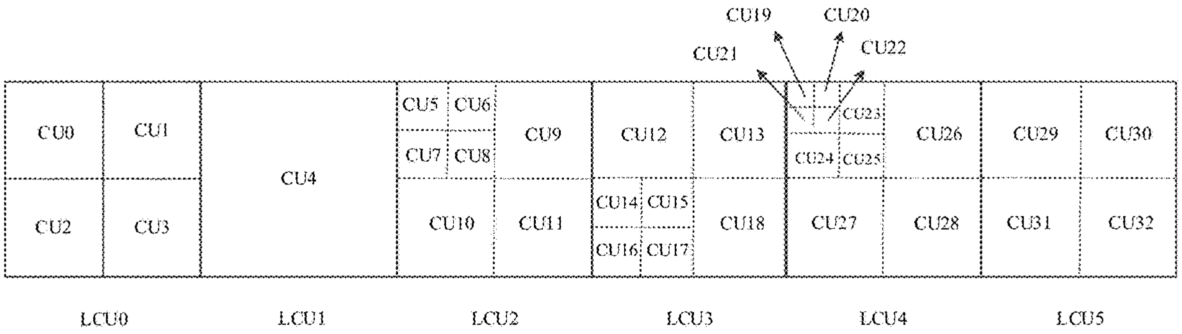
FIG. 7 is a schematic diagram of wavefront parallel processing (WPP) threads according to some embodiments.

In some embodiments, a plurality of WPP threads need to be created first, and then parallel coding of the WPP threads can be performed. Referring to FIG. 7, it is assumed that a plurality of WPP threads are created, which are a WPP0 thread, a WPP1 thread, a WPP2 thread, a WPP3 thread, a WPP4 thread, and a WPP5 thread respectively. In some embodiments, three threads may be created. Each thread may be used in cyclic coding. In this case, the WPP0 thread may be understood as a WPP0-1 thread, and the WPP3 may be understood as a WPP0-2 thread. Similarly, the WPP4 thread is a WPP1-2 thread, and the WPP5 thread is a WPP2-2 thread.

The to-be-processed image is divided into 6 rows of LCUs, and each row of LCU includes 6 LCUs. The size of each LCU is 64×64 pixels. The first row of LCUs corresponds to the WPP0 thread, the second row of LCUs corresponds to the WPP1 thread, the third row of LCUs corresponds to the WPP2 thread, the fourth row of LCUs corresponds to the WPP3 thread, the fifth row of LCUs corresponds to the WPP4 thread, and the sixth row of LCUs corresponds to the WPP5 thread.

Referring to FIG. 7, the first row of LCUs is used as an example. The first row of LCUs includes an LCU0, an LCU1, an LCU2, an LCU3, an LCU4, and an LCU5. It is assumed that the LCU0 includes a CU0 to a CU3, the LCU1 includes a CU4, the LCU2 includes a CU5 to a CU11, the LCU3 includes a CU12 to a CU18, the LCU4 includes a CU19 to a CU28, and the LCU5 includes a CU29 to a CU32. Apparently, the CU0 to the CU32 are all located in the first row of LCUs. Therefore, the CU set associated with the WPP0 thread includes: the CU0 to the CU32.

S502: Perform the following operation for each WPP thread: obtaining, based on task subsets respectively corresponding to CUs in a CU set associated with a WPP thread, a total set of tasks to be executed by the WPP thread, each task subset including N types of tasks. N is a positive integer.

In some embodiments, in the coding process, each CU needs to be processed through operations such as Pred, TQ, and RDO. The Pred processing process is used as a Pred task, the TQ process is used as a TQ task, and the RDO processing is used as an RDO task. That is, the N types of tasks include: at least one of the Pred task, the TQ task, and the RDO task.

After obtaining the task subsets respectively corresponding to the CUs in the CU set associated with the WPP thread, the task subset corresponding to each CU includes N types of tasks, and the N types of tasks respectively corresponding to the CUs in the CU set are used as tasks in the total set of tasks to be executed by the WPP thread.

The WPP0 thread is used as an example. Referring to FIG. 7, a CU set associated with the WPP0 thread includes: the CU0 to the CU32. Each CU in the CU0 to the CU32 corresponds to three tasks: Pred, TQ, and RDO. The CU0 is used as an example. A task subset corresponding to the CU0 includes: a Pred task, a TQ task, and an RDO task for the CU0. Based on the task subsets respectively corresponding to the CU0 to the CU32, a total set of tasks to be executed by the WPP0 thread is obtained. The total set of tasks to be executed by the WPP0 thread includes: tasks in the task subsets respectively corresponding to the CU0 to the CU32.

Further, because one CU includes one luminance component and two chrominance components (that is, one luminance coding block and two chrominance coding blocks), for each of the CUS, each type of task includes one luminance coding task and two chrominance coding tasks.

Still referring to FIG. 7, the CU0 is used as an example. The task subset corresponding to the CU0 includes the following 9 tasks: a Pred task for a luminance component of the CU0 (CU0-Y Pred task), a Pred task for one chrominance component of the CU0 (CU0-U Pred task), a Pred task for the other chrominance component of the CU0 (CU0-V Pred task), a TQ task for the luminance component of the CU0 (CU0-Y TQ task), a TQ task for one chrominance component of the CU0 (CU0-U TQ task), a TQ task for the other chrominance component of the CU0 (CU0-V TQ task), an RDO task for the luminance component of the CU0 (CU0-Y RDO task), an RDO task for one chrominance component of the CU0 (CU0-U RDO task), and an RDO task for the other chrominance component of the CU0 (CU0-V RDO task).

S503: Respectively determine, based on processing resources respectively distributed to the N types, processing resources respectively corresponding to tasks included in each total set of tasks.

In some embodiments, respective corresponding processing resources are pre-distributed for the N types of tasks. For example, corresponding Pred processing resources are distributed to Pred tasks, corresponding TQ processing resources are distributed to TQ tasks, and corresponding RDO processing resources are distributed to RDO tasks.

In some embodiments, because processing speeds of CUs (or coding blocks) of different sizes are different, in order to further improve the processing efficiency, respective corresponding processing resources are distributed for different CU sizes (or coding block sizes). That is, the processing resources distributed to each of the N types include: a set of processing resources distributed for various CU sizes (or coding block sizes), and each processing resource corresponds to one block size.

Figure 8:
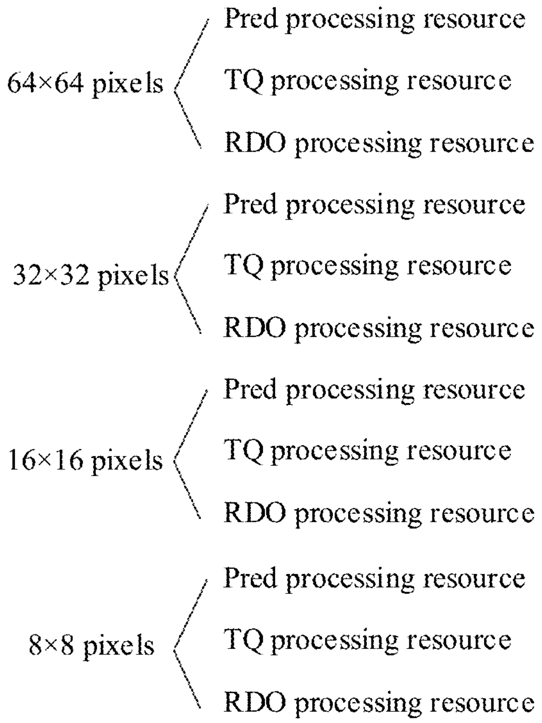
FIG. 8 is a schematic diagram of pipelines according to some embodiments.

For example, referring to FIG. 8, because the size of a CU may be 8×8 pixels, 16×16 pixels, 32×32 pixels, and 64×64 pixels, different processing resources may be distributed for 8×8 pixels, 16×16 pixels, 32×32 pixels, and 64×64 pixels. That is, the Pred processing resources include: Pred processing resources respectively corresponding to 8×8 pixels, 16×16 pixels, 32×32 pixels, and 64×64 pixels; the TQ processing resources include: TQ processing resources respectively corresponding to 8×8 pixels, 16×16 pixels, 32×32 pixels, and 64×64 pixels; and the RDO processing resources include: RDO processing resources respectively corresponding to 8×8 pixels, 16×16 pixels, 32×32 pixels, and 64×64 pixels.

In some embodiments, N types of processing resources corresponding to the same CU size may be referred to as a pipeline. For example, a pipeline corresponding to 16×16 pixels includes: a Pred processing resource of 16×16 pixels, a TQ processing resource of 16×16 pixels, and an RDO processing resource of 16×16 pixels.

In some embodiments, a pipeline corresponding to a CU size may also be configured to process tasks of other CU sizes. For example, a pipeline corresponding to 16×16 pixels may also be configured to process tasks of a CU of 8×8 pixels, that is, a pipeline corresponding to 16×16 pixels may also correspond to tasks of a CU of 8×8 pixels. Furthermore, the processing resources respectively corresponding to the CUs in the to-be-processed image can be determined respectively based on the CU sizes and the quantity of CUs with reference to the processing resource sets respectively distributed to the N types. In this way, when one pipeline occupies an excessively large quantity of resources, other pipelines may be used for processing, thereby improving the coding efficiency.

In some embodiments, the respectively determining, based on processing resources respectively distributed to the N types, processing resources respectively corresponding to tasks included in each total set of tasks includes:

respectively determining processing resources respectively corresponding to the CUs in the to-be-processed image based on respective sizes of the CUs in the to-be-processed image with reference to the processing resource sets respectively distributed to the N types; and respectively determining the processing resources respectively corresponding to the tasks included in each total set of tasks based on the processing resources respectively corresponding to the CUs in the to-be-processed image.

For each of the N types, each processing resource in the processing resource set distributed to the type is configured to: process tasks corresponding to a CU of a corresponding CU size. In some embodiments, for each type of processing resource in the N types of processing resources, the processing resources are subdivided into several processing resources according to various CU sizes, and then a processing resource set distributed to the type is obtained based on the several processing resources.

Processing resources include, but not limited to, resources required to perform tasks of corresponding types in the coding process, such as processor resources and internal memory resources.

In a possible implementation, the tasks respectively corresponding to the luminance component and the chrominance components of a CU may be processed in the pipeline corresponding to the size of the CU, that is, after the processing resources respectively corresponding to the CUs in the to-be-processed image are determined respectively directly based on the size corresponding to the CU with reference to the processing resource sets respectively distributed to the N types, the processing resources respectively corresponding to the tasks included in each total set of tasks are determined respectively based on the processing resources respectively corresponding to the CUs in the to-be-processed image.

The CU0 is used as an example. The size of the CU0 is 32×32 pixels. Combined with a Pred processing resource set, a TQ processing resource set, and an RDO processing resource set, the processing resources corresponding to the CU0 include: a Pred processing resource corresponding to 32×32 pixels, a TQ processing resource corresponding to 32×32 pixels, and an RDO processing resource corresponding to 32×32 pixels. The task subset corresponding to the CU0 includes: a Pred task for the CU0, a TQ task for the CU0, and an RDO task for the CU0. The Pred task for the CU0 includes Pred tasks for the luminance component and the two chrominance components of the CU0, the TQ task for the CU0 includes TQ tasks for the luminance component and the two chrominance components of the CU0, and the RDO task for the CU0 includes RDO tasks for the luminance component and the two chrominance components of the CU0. Therefore, based on the processing resources corresponding to the CU0, it is determined that the processing resource corresponding to the Pred task for the CU0 is the Pred processing resource corresponding to 32×32 pixels, the processing resource corresponding to the TQ task for the CU0 is the TQ processing resource corresponding to 32×32 pixels, and the processing resource corresponding to the RDO task for the CU0 is the RDO processing resource corresponding to 32×32 pixels.

In another possible implementation, for the one luminance component and the two chrominance components included in each CU, because the coding block sizes of the luminance component and the chrominance components are different, in order to further improve the coding efficiency, the respectively determining processing resources respectively corresponding to the CUs in the to-be-processed image based on the respective sizes of the CUs in the to-be-processed image with reference to the processing resource sets respectively distributed to the N types includes:

- respectively determining processing resources respectively corresponding to the luminance components in the to-be-processed image based on respective sizes of the luminance CUs in the to-be-processed image with reference to the processing resource sets respectively distributed to the N types; and
- respectively determining processing resources respectively corresponding to the chrominance components in the to-be-processed image based on respective sizes of the chrominance CUs in the to-be-processed image with reference to the processing resource sets respectively distributed to the N types.

Figure 9:
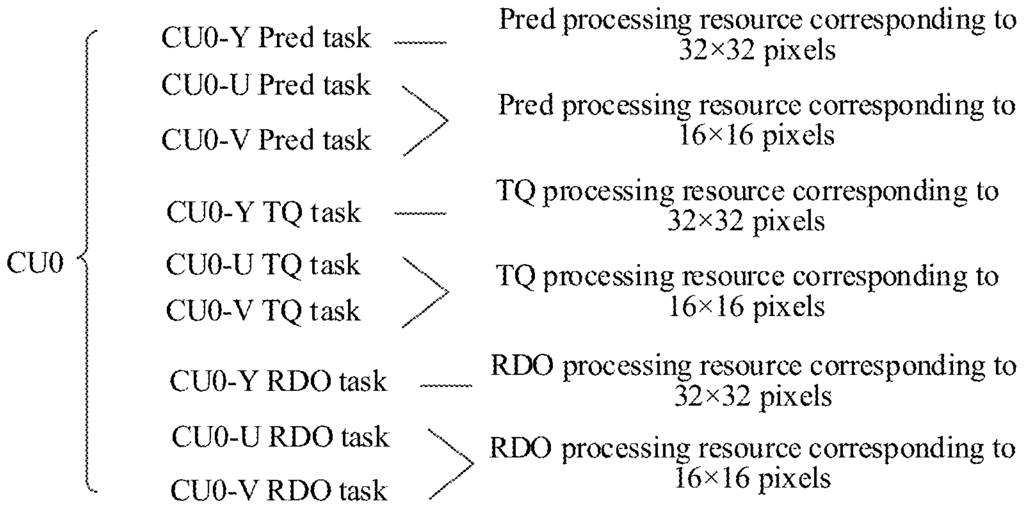
FIG. 9 is a schematic diagram of determining processing resources corresponding to tasks according to some embodiments.

The CU0 is still used as an example. As shown in FIG. 9, the CU0 includes one luminance component and two chrominance components. The luminance component of the CU0 is referred to as a CU0-Y, and the two chrominance components of the CU0 are referred to as a CU0-U and a CU0-V. Because the size of the CU0 is 32×32 pixels, a coding block size of the CU0-Y is 32×32 pixels, and coding block sizes of the CU0-U and the CU0-V are both 16×16 pixels. According to the respective sizes of the CU0-Y, the CU0-U, and the CU0-V, combined with the processing resources respectively distributed to the three types, it is determined that the processing resources corresponding to the CU0-Y include: a Pred processing resource corresponding to 32×32 pixels, a TQ processing resource corresponding to 32×32 pixels, and an RDO processing resource corresponding to 32×32 pixels; the processing resources corresponding to the CU0-U include: a Pred processing resource corresponding to 16×16 pixels, a TQ processing resource corresponding to 16×16 pixels, and an RDO processing resource corresponding to 16×16 pixels; and the processing resources corresponding to the CU0-V include: a Pred processing resource corresponding to 16×16 pixels, a TQ processing resource corresponding to 16×16 pixels, and an RDO processing resource corresponding to 16×16 pixels.

The task subset corresponding to the CU0 includes the following nine tasks: a CU0-Y Pred task, a CU0-U Pred task, a CU0-V Pred task, a CU0-Y TQ task, a CU0-U TQ task, a CU0-V TQ task, a CU0-Y RDO task, a CU0-U RDO task, and a CU0-V RDO task. The processing resources respectively corresponding to the nine tasks are determined based on the processing resources corresponding to the CU0-U. The processing resource corresponding to the CU0-Y Pred task is: the Pred processing resource corresponding to 32×32 pixels, the processing resource corresponding to the CU0-Y TQ task is: the TQ processing resource corresponding to 32×32 pixels, the processing resource corresponding to the CU0-Y RDO task is: the RDO processing resource corresponding to 32×32 pixels, the processing resources corresponding to the CU0-U Pred task and the CU0-V Pred task are both: the Pred processing resource corresponding to 16×16 pixels, the processing resources corresponding to the CU0-U TQ task and the CU0-V TQ task are both: the TQ processing resource corresponding to 16×16 pixels, and the processing resources corresponding to the CU0-U RDO task and the CU0-V RDO task are both: the RDO processing resource corresponding to 16×16 pixels.

By placing luminance coding blocks and chrominance coding blocks of the same size in the same pipeline for processing, computing and storage resources can be saved, thereby increasing the processing speed, reducing the resource consumption, and improving the coding performance.

In some embodiments, YUV sampling is merely used as an example for illustration, but this is not limited thereto.

S504: Obtain a scheduling order of the tasks in each total set of tasks based on dependency relationships between coding results for the CUs in the to-be-processed image, the scheduling order supporting parallel processing of at least two WPP threads.

In some embodiments, 3WPP parallel processing is adopted, and when the encoder data dependency is met, three LCU rows are started simultaneously for coding.

Figure 10:
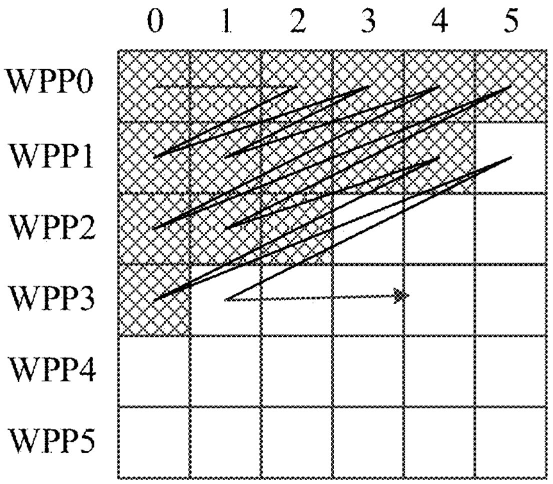
FIG. 10 is a schematic diagram of a WPP thread scheduling order according to some embodiments.

Referring to FIG. 10, the shaded portion indicates coded LCUs, the direction of the arrow indicates an LCU coding order, the start of the WPP1 thread requires that coding of the upper adjacent LCU and the upper right adjacent LCU of the WPP0 row is completed (that is, coding of the LCU0 and the LCU1 of the first row is completed), the start of the WPP2 thread requires that coding of the upper adjacent LCU and the upper right adjacent LCU of the WPP1 row is completed (that is, coding of the LCU0 and the LCU1 of the second row is completed), the start of the WPP3 thread requires that coding of the upper adjacent LCU and the upper right adjacent LCU of the WPP2 row is completed, and similarly, the start of other WPP threads are not described herein again.

In FIG. 10, when the coding of the LCU0 and the LCU1 of the WPP0 row is completed, the coding of the LCU0 of the WPP1 row starts, that is, the LCU2 of the WPP0 row and the LCU0 of the WPP1 row are processed in parallel; and when the coding of the LCU0 and the LCU1 of the WPP1 row is completed, the coding of the LCU0 of the WPP2 row starts, that is, the LCU3 of the WPP0 row, the LCU2 of the WPP1 row, and the LCU0 of the WPP2 row are processed in parallel.

In some embodiments, the dependency relationship includes, but not limited to, at least one of the following relationships:

Dependency relationship 1: for each two CUs that are adjacent in the horizontal direction (that is, adjacent to each other left and right) in the to-be-processed image, coding of a luminance coding block of the right CU depends on a coding result for a luminance coding block of the left CU.

Referring to FIG. 3A, in some embodiments, CU coding is performed in the order of Z scanning within the CTU (or LCU). FIG. 3A is used as an example. The Z scanning is to perform coding in the order of 0→1→2→3, which can ensure that the CUs on the left and above the to-be-coded CU have been coded, so that the coding results for the coded CUs can be used for intra-frame prediction and inter-frame prediction.

Figure 11:
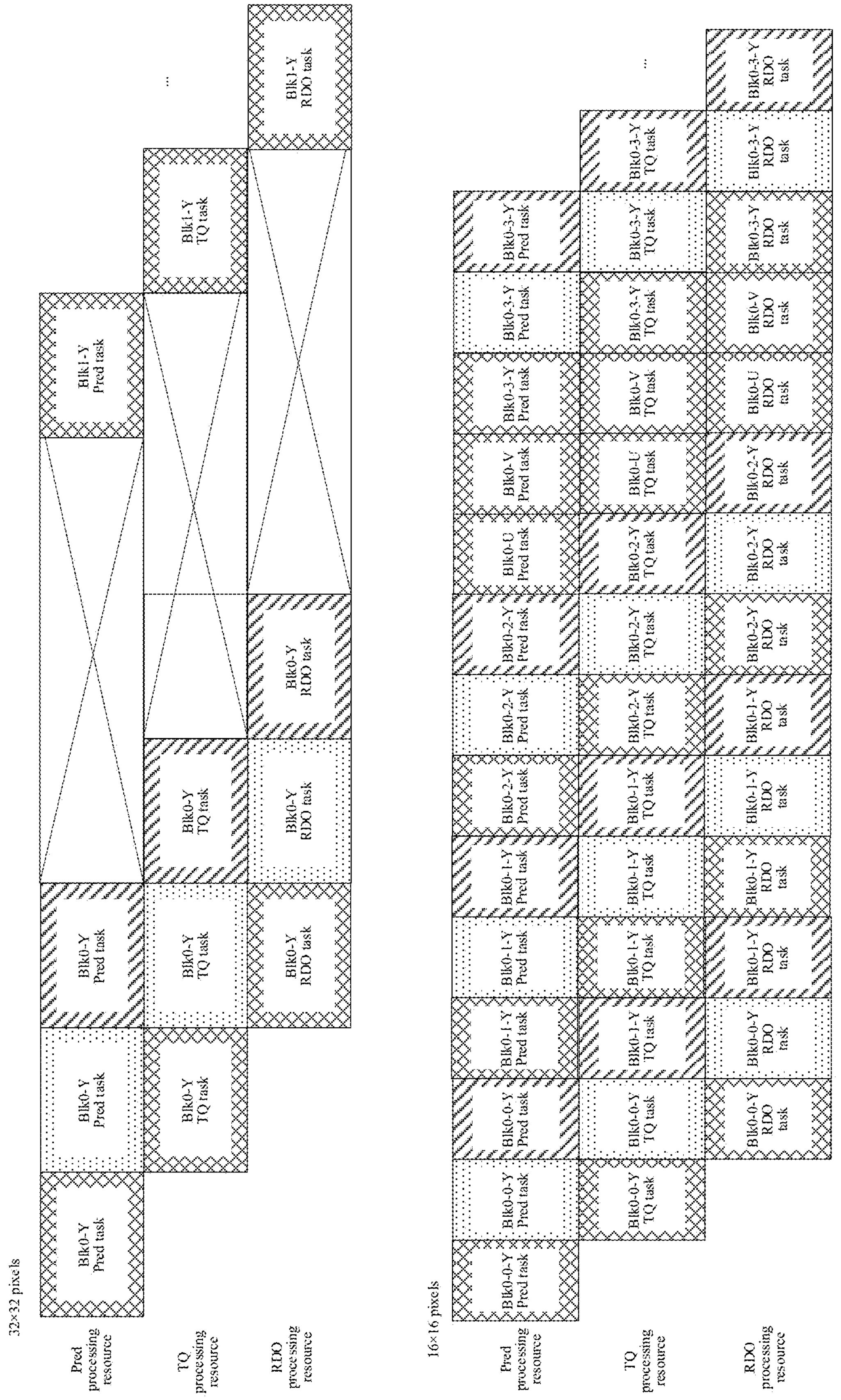
FIG. 11 is a schematic diagram of a scheduling relationship according to some embodiments.

FIG. 11 is a schematic diagram of a scheduling order according to some embodiments. In FIG. 11, the grid region represents the CU of the WPP0 thread, the dotted region represents the CU of the WPP1 thread, the diagonal region represents the CU of the WPP2 thread, and "x" represents no task. The CU may also be referred to as Blk. Blk0-Y is used as an example. Blk0-Y represents the luminance component (that is, the luminance coding block) of the first CU. In this scheduling order, for each pipeline, three WPPs can process tasks simultaneously. For example, the WPP2 thread processes a Blk0-Y Pred task, the WPP1 thread processes a Blk0-Y TQ task, and the WPP0 thread processes a Blk0-Y RDO task in parallel. In addition, Blk0-0, Blk0-1, Blk0-2, and Blk0-3 represent four CUs divided from the Blk0.

Figure 12A:
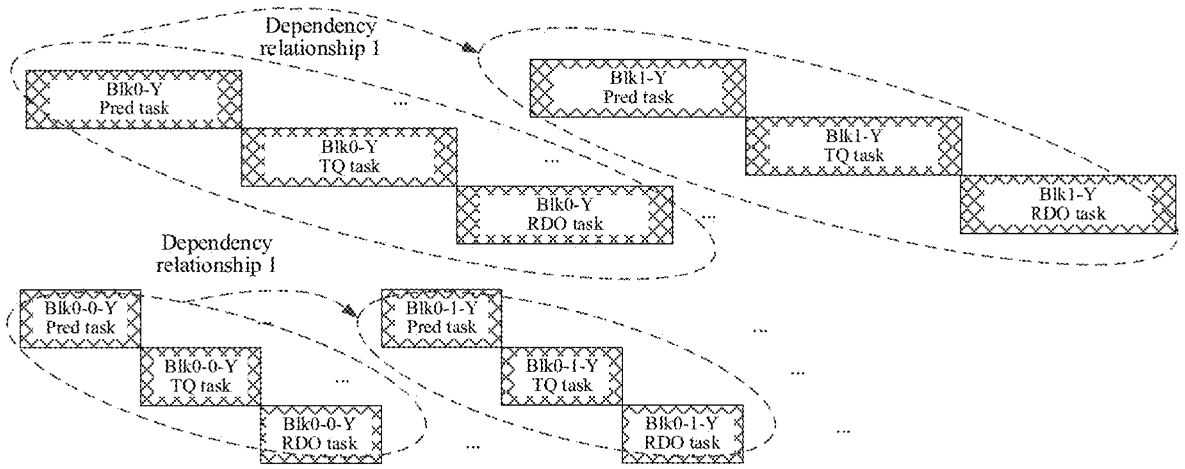
FIG. 12A is a schematic diagram of a dependency relationship 1 according to some embodiments.

Referring to FIG. 12A, because luminance coding of the CU1 depends on a luminance coding result for the CU0, the Blk1-Y task is executed after the Blk0-Y task is executed. Only the WPP0 thread is used as an example. Whether in the pipeline corresponding to 32×32 pixels or in the pipeline corresponding to 16×16 pixels, for the Pred task, the Blk0-0-Y Pred task is executed first, and then the Blk0-1-Y Pred task is executed; for the TQ task, the Blk0-0-Y TQ task is executed first, and then the Blk0-1-Y TQ task is executed; and for the RDO task, the Blk0-0-Y RDO task is executed first, and then the Blk0-1-Y RDO task is executed.

Dependency relationship 2: chrominance coding of each CU in the to-be-processed image depends on a corresponding luminance coding result.

In some embodiments, for each CU, the chrominance coding of the CU depends on the luminance coding result for the CU. Considering that the luminance component and chrominance components included in a CU are processed by different processing resources, for the luminance component and the two chrominance components included in a CU, a task of the luminance component located in one pipeline is executed first, and a task of a chrominance component located in another pipeline is executed later.

Figure 12B:
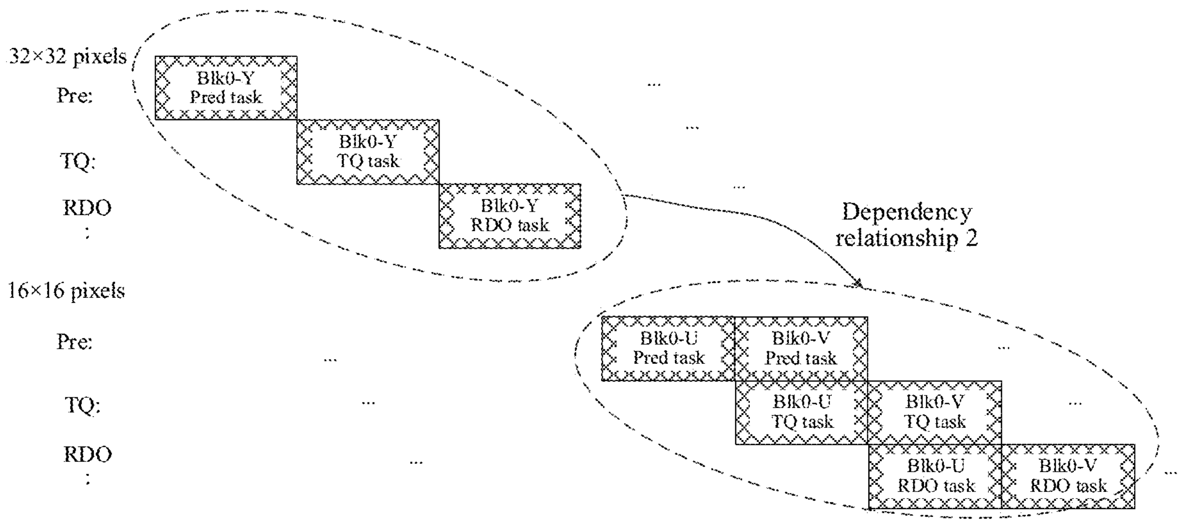
FIG. 12B is a schematic diagram of a dependency relationship 2 according to some embodiments.

Referring to FIG. 12B, because the chrominance coding of each CU depends on the corresponding luminance coding result, after the Blk0-Y task is executed, a Blk0-U task and a Blk0-V task are executed. Only the WPP0 thread is used as an example. The Blk0-Y task includes: a Blk0-Y Pred task, a Blk0-Y TQ task, and a Blk0-Y RDO task. In the pipeline corresponding to 32×32 pixels, the Blk0-Y Pred task, the Blk0-Y TQ task, and the Blk0-Y RDO task are executed in sequence, and then the Blk0-U task and the Blk0-V task are executed in sequence. The Blk0-U task includes: a Blk0-U Pred task, a Blk0-U TQ task, and a Blk0-U RDO task, and the Blk0-V task includes: a Blk0-V Pred task, a Blk0-V TQ task, and a Blk0-V RDO task.

Dependency relationship 3: for each two CUs adjacent to each other left and right in the to-be-processed image, luminance coding of the right CU depends on a chrominance coding result for the left CU.

In some embodiments, there is also a data dependency relationship between the Pred task, the TQ task, and the RDO task. After the Pred task is executed, the TQ task is executed first, and then the RDO task is executed.

Figure 12C:
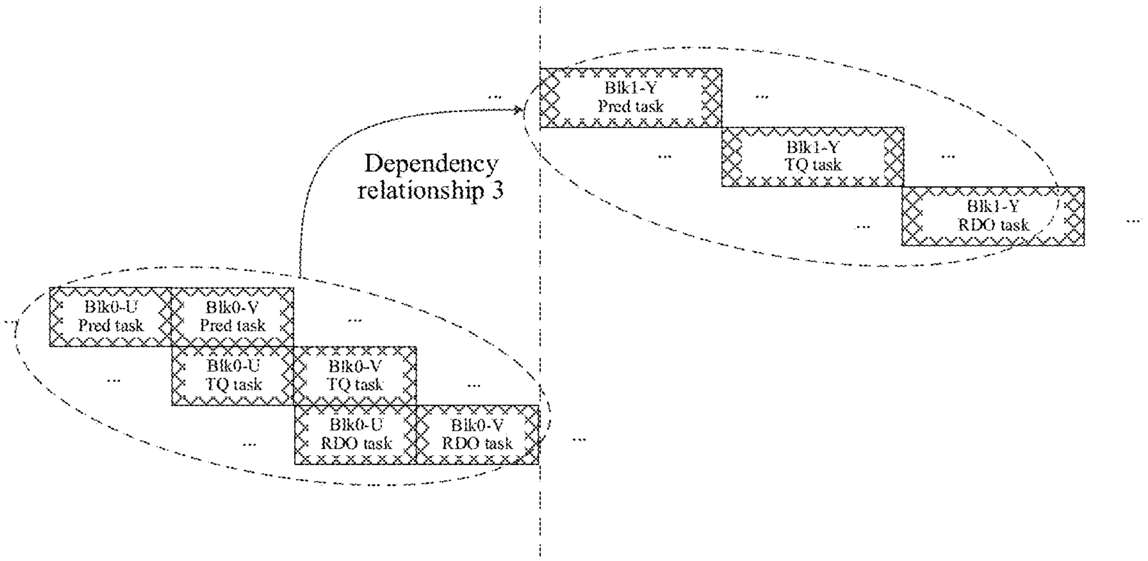
FIG. 12C is a schematic diagram of a dependency relationship 3 according to some embodiments.

The WPP0 is still used as an example. Referring to FIG. 12C, because for each two adjacent CUs, luminance coding of the right CU depends on a chrominance coding result for the left CU, after a chrominance task of the left CU is completed, a luminance task of the right CU is executed, that is, after the Blk0-U task and the Blk0-V task are executed, the Blk1-Y task is executed. In some embodiments, the Blk0-U task includes: the Blk0-U Pred task, the Blk0-U TQ task, and the Blk0-U RDO task, and the Blk0-V task includes: the Blk0-V Pred task, the Blk0-V TQ task, and the Blk0-V RDO task. Therefore, after the Blk0-U task and the Blk0-V task are executed, the Blk1-Y task is executed. The Blk1-Y task includes: the Blk1-Y Pred task, the Blk1-Y TQ task, and the Blk1-Y RDO task. Because the latest executed task among the Blk0-U task and the Blk0-V task is the Blk0-V RDO task, the Blk1-Y task may also be executed after the Blk0-V RDO task is executed.

S505: Call corresponding WPP threads to process corresponding tasks in the scheduling order based on the processing resources respectively corresponding to the tasks in the total set of tasks, to obtain a coding result for the to-be-processed image.

In some embodiments, a first WPP thread is started, and based on the processing resources respectively corresponding to tasks in a total set of tasks of the first WPP thread, the first WPP thread is used to process the corresponding tasks in the scheduling order, and generate corresponding coding information.

Starting from the second WPP thread, the following operations are performed on each WPP thread in sequence:

starting the current WPP thread when the previous WPP thread completes coding of CUs in a set region; and using, based on the coding information corresponding to the CUs in the set region and based on processing resources respectively corresponding to tasks in a total set of tasks of the current WPP thread, the current WPP thread to process corresponding tasks in the scheduling order, and generating corresponding coding information.

The set region may refer to the upper adjacent LCU and the upper right adjacent LCU, that is, the LCU0 and the LCU1 in the previous row of LCUs.

Figure 13:
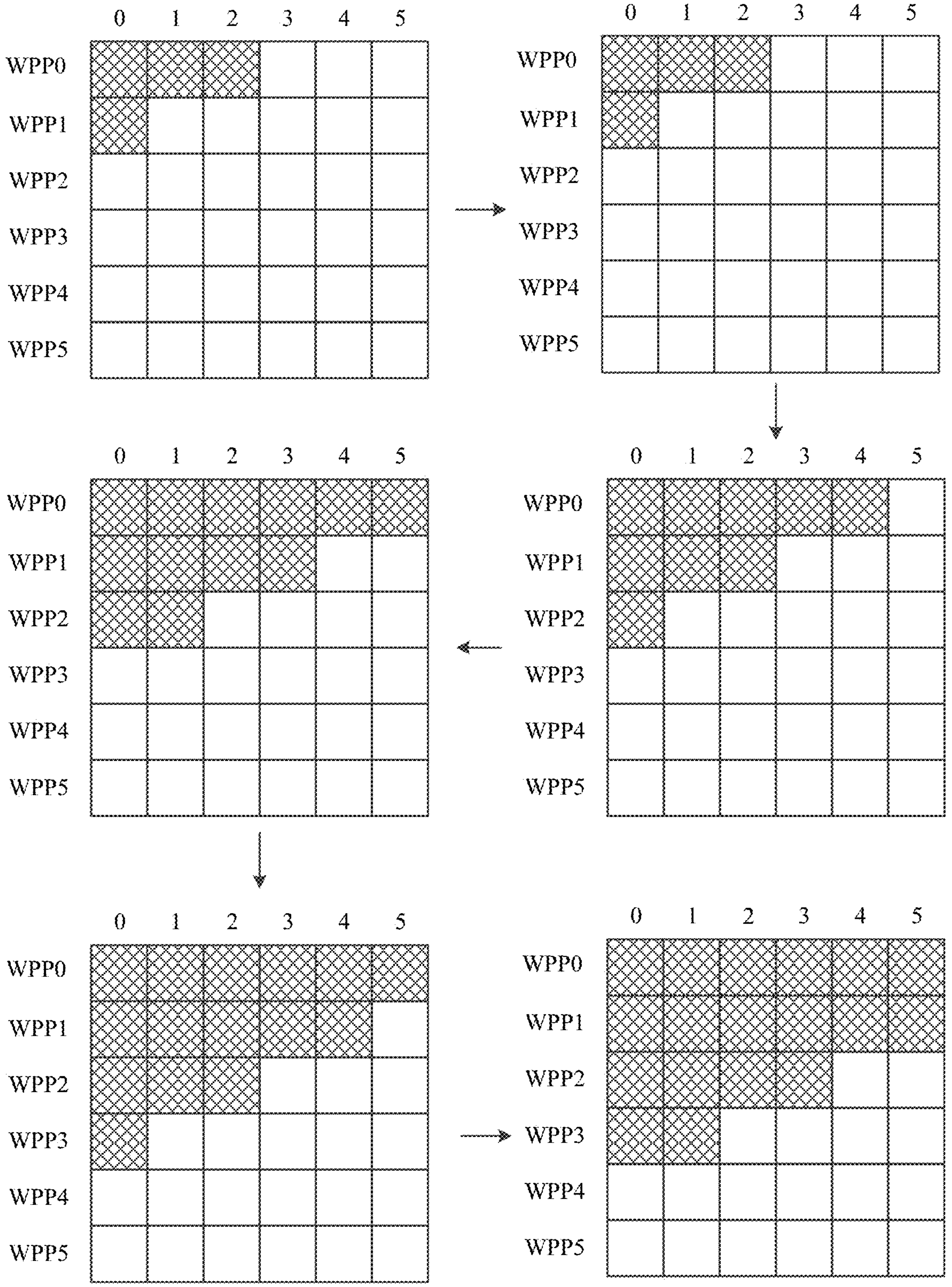
FIG. 13 is a schematic diagram of a WPP thread start order according to some embodiments.

For example, referring to FIG. 13, the first WPP thread is the WPP0 thread, the WPP0 thread corresponds to the first row of LCUs, the WPP1 thread corresponds to the second row of LCUs, the WPP2 thread corresponds to the third row of LCUs, the WPP3 thread corresponds to the fourth row of LCUs, the WPP4 thread corresponds to the fifth row of LCUs, and the WPP5 thread corresponds to the sixth row of LCUs.

First, the first WPP thread is the WPP0 thread. The WPP0 thread is started, and based on the processing resources respectively corresponding to the tasks in the total set of tasks of the WPP0, the WPP0 thread is used to process the LCU0 and LCU1 in the first row in the scheduling order.

In some embodiments, any CU in the first row of LCU is used as an example. It is assumed that a size of the CU is 16×16 pixels, the Pred resource, the TQ resource, and the RDO resource for 16×16 pixels are used to process the Pred task, the TQ task, and the RDO task corresponding to the luminance component of the CU in sequence, to obtain a luminance coding result, and then the Pred resource, the TQ resource, and the RDO resource for 8×8 pixels are used to process the Pred tasks, the TQ tasks, and the RDO tasks corresponding to the chrominance components of the CU0 respectively, to obtain a chrominance coding result. Similarly, the other LCUs in the first row of LCUs are coded in sequence.

When the coding of the LCU0 and the LCU1 in the first row of LCUs is completed, the WPP1 thread is started. That is, when the WPP0 thread processes the LCU2 in the first row of LCUs, the WPP1 thread processes the LCU0 in the second row, and then the WPP1 thread is used to process the LCU0 to the LCU5 in the second row in the scheduling order based on the processing resources respectively corresponding to the tasks in the total set of tasks of the WPP1 thread.

When the coding of the LCU0 and the LCU1 in the second row of LCUs is completed, the WPP2 is started. That is, when the WPP0 processes the LCU4 in the first row of LCUs, the WPP1 processes the LCU3 in the second row, and the WPP2 processes the LCU0 in the third row; and then the WPP2 thread is used to process the LCU0 to the LCU5 in the third row in the scheduling order based on the processing resources respectively corresponding to the tasks in the total set of tasks of the WPP2 thread.

Similarly, each of the WPP3 thread, the WPP4 thread, and the WPP5 thread is started after the second LCU in the previous row is coded, and process the LCU0 to the LCU5 in the corresponding row in the scheduling order based on the corresponding processing resources.

In some embodiments, processing priorities respectively corresponding to processing resources may alternatively be acquired in response to a processing priority configuration operation triggered by a target object for the processing resources. The calling corresponding WPP threads to process corresponding tasks in the scheduling order based on the processing resources respectively corresponding to the tasks in the total set of tasks, to obtain a coding result for the to-be-processed image may be implemented in, but not limited to, the following manner:

adjusting the scheduling order based on the processing priorities respectively corresponding to the processing resources, and calling the corresponding WPP threads to process the corresponding tasks in the adjusted scheduling order based on the processing resources respectively corresponding to the tasks in the total set of tasks, to obtain the coding result for the to-be-processed image.

The processing priorities respectively corresponding to the processing resources may be the same or different. In some embodiments, the adjusted scheduling order still meets a dependency condition.

If the processing priorities respectively corresponding to the processing resources are the same, then based on dependency relationships between coding results for the CUs in the to-be-processed image, after the scheduling order of the tasks in each total set of tasks is obtained, in an implementation, the scheduling order may not be adjusted. That is, the corresponding WPP threads are called in the scheduling order directly based on the processing resources respectively corresponding to the tasks in the total set of tasks, to process the corresponding tasks to obtain the coding result for the to-be-processed image.

In another implementation, according to a quantity of tasks corresponding to each processing resource, for a processing resource corresponding to a quantity of tasks exceeding a set task quantity threshold, some of the tasks corresponding to the processing resource that exceed the set task quantity threshold may be adjusted to tasks corresponding to other processing resources other than the processing resource, the other processing resources referring to processing resources that support processing on the some tasks, and then the scheduling order is adjusted based on the correspondence between the adjusted tasks and the processing resources. Further, the corresponding WPP threads are called in the adjusted scheduling order based on the processing resources respectively corresponding to the tasks in the total set of tasks, to process the corresponding tasks to obtain the coding result for the to-be-processed image.

The some tasks to be adjusted may be randomly selected from the tasks corresponding to the processing resource, or may be selected according to the scheduling order, and this is not limited. The processing resource supporting task processing refer to a processing resource corresponding a CU size not less than the CU size corresponding to the task.

Because the Pred task, the TQ task, and the RDO task need to be executed in sequence, during task adjustment, the Pred task, the TQ task, and the RDO task are adjusted simultaneously.

For example, the Pred resource is merely used as an example. It is assumed that the set task quantity threshold is 15, and a quantity of tasks corresponding to the Pred resource of 16×16 pixels is 16. In this case, the quantity of tasks corresponding to the Pred resource of 16×16 pixels exceeds the set task quantity threshold, then the Blk0-U Pred task in the tasks corresponding to the Pred resource of 16×16 pixel is adjusted to a task corresponding to the Pred resource of 32×32 pixels, the Blk0-U TQ task in the tasks corresponding to the TQ resource of 16×16 pixels is adjusted to a task corresponding to the TQ resource of 32×32 pixels, and the Blk0-U RDO task in the tasks corresponding to the RDO resource of 16×16 pixels is adjusted to a task corresponding to the RDO resource of 32×32 pixels.

Figure 14:
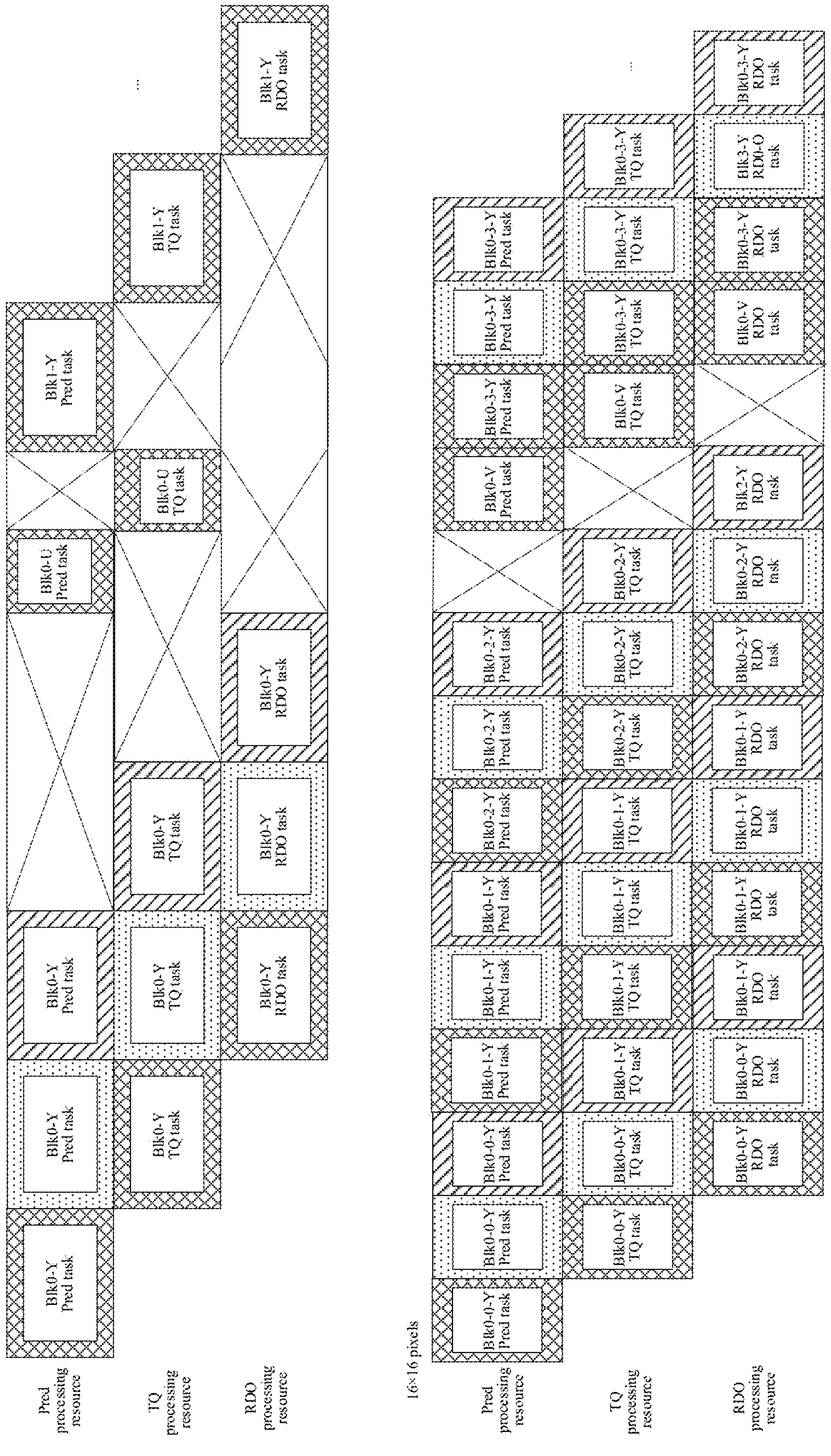
FIG. 14 is a schematic diagram of another scheduling relationship according to some embodiments.

Referring to FIG. 14, the scheduling order is adjusted based on the correspondence between the adjusted tasks and the processing resources. In the adjusted scheduling order, after the Pred resource, the TQ resource, and the RDO resource of 32×32 pixels respectively process the Blk0-U Pred task, the Blk0-U TQ task, and the Blk0-U RDO task, the Pred resource, the TQ resource, and the RDO resource of 16×16 pixels respectively process the Blk0-V Pred task, the Blk0-V TQ task, and the Blk0-V RDO task.

If the processing priorities respectively corresponding to the processing resources are different, the scheduling relationship is adjusted based on the processing priorities respectively corresponding to the processing resources. In some embodiments, when the scheduling relationship is adjusted based on the processing priorities respectively corresponding to the processing resources, if a processing priority of a processing resource is higher than a processing priority of another processing resource, in the adjusted scheduling order, an execution order of a task corresponding to the processing resource with the high processing priority is earlier than that of a task corresponding to the processing resource with the low processing priority.

For example, a processing priority of a pipeline of 16×16 pixels is higher than that of a pipeline of 8×8 pixels. Therefore, during processing on a task of 16×16 pixels and a task of 8×8 pixels, an execution order of the task of 16×16 pixels is earlier than that of the task of 8×8 pixels.

Based on the foregoing implementation, through priority control, N types of tasks can be processed in parallel while the corresponding N types of resources are fully utilized, so that the resource utilization is optimized, thereby improving the coding efficiency and the coding quality.

In some embodiments, when tasks of different CUs are processed in different pipelines, and different pipelines process tasks of different CUs, task completion moments of the associated CUs are matched at a synchronization node. Matching may mean that the task completion moments of the CUs are the same, or that differences between the task completion moments of the CUs are within a preset range.

In HEVC, because the minimum segmentation unit is 8×8 pixels, for selection of an optimal division mode for an LCU, when the size of the LCU is 64×64 pixels and the maximum coding depth is 3, it is necessary to traverse the segmentation from 64×64 pixels to 8×8 pixels, that is, 85 CUs, and determine the optimal segmentation manner of the LCU by calculating a rate-distortion cost. The 85 CUs include: one CU of 64×64 pixels, 4 CUs of 32×32 pixels, 16 CUs of 16×16 pixels, and 64 CUs of 8×8 pixels.

In the process of selecting the optimal division mode of the LCU, for each CU, each intra-frame prediction mode and each inter-frame prediction mode are traversed, and an optimal prediction mode, that is, an optimal prediction unit (PU), is determined based on the rate-distortion cost.

For the intra-frame prediction mode, the luminance component has 35 intra-frame prediction modes. The 35 intra-frame prediction modes include: a Planar mode, a direct current (DC) mode, and 33 angle modes; and the chrominance component has five intra-frame prediction modes. The five intra-frame prediction modes include: the Planar mode, the DC mode, a horizontal direction mode, a vertical direction mode, and the intra-frame prediction mode corresponding to the luminance component. For the inter-frame prediction modes, the inter-frame prediction modes mainly include: an inter-frame mode (Inter mode), a Merge mode, and a Skip mode.

The process of determining the optimal division mode and the optimal prediction mode of the LCU may be divided into the following operations:

First operation: For a coding unit a with a size of 64×64 pixels and a depth of 0, each intra-frame prediction mode and each inter-frame prediction mode are traversed, to obtain an optimal prediction mode and a rate-distortion cost Ra when the depth is 0.

Second operation: a is further divided to obtain four CUs of 32×32 pixels: b0, b1, b2, and b3, and in this case, the coding depth is 1.

First, each intra-frame prediction mode and each inter-frame prediction mode are traversed for the coding unit b0, to obtain an optimal prediction mode and a rate-distortion cost Rb0 of b0.

Third operation: b0 is further divided to obtain four CUs of 16×16 pixels: c0, c1, c2, and c3, and in this case, the coding depth is 2.

Each intra-frame prediction mode and each inter-frame prediction mode are traversed for c0, to obtain an optimal prediction mode and a rate-distortion cost Rc0 of c0.

Fourth operation: c0 is further divided to obtain four CUs of 8×8 pixels: d0, d1, d2, and d3. In this case, the coding depth is 3, which has reached the maximum coding depth, and c0 cannot be divided. For d0, d1, d2, and d3, each intra-frame prediction mode and each inter-frame prediction mode are traversed respectively, to obtain respective corresponding optimal prediction modes and rate-distortion costs Rd0, Rd1, Rd2, and Rd3, and a sum of the rate-distortion costs of d0, d1, d2, and d3 is calculated, and the sum of the rate-distortion costs of d0, d1, d2, and d3 is compared with Rc0. The smaller value is selected from the sum of the rate-distortion costs of d0, d1, d2, and d3 and Rc0 as an optimal rate-distortion cost Min-Rc0 of c0, and then the corresponding prediction mode and segmentation manner are used as the optimal prediction mode and segmentation manner of c0.

Fifth operation: Referring to the fourth operation, division and prediction mode selections are sequentially performed on c1, c2, and c3, to obtain the respective corresponding optimal prediction modes and rate-distortion costs Min-Rc1, Min-Rc2, and Min-Rc3 respectively, and the sum of the rate-distortion costs of c0, c1, c2, and c3 (the sum of Min-Rc0, Min-Rc1, Min-Rc2, and Min-Rc3) is calculated. Subsequently, the sum of the rate-distortion costs of c0, c1, c2, and c3 is compared with Rb0. The smaller value is selected from the sum of the rate-distortion costs of c0, c1, c2, and c3 and Rb0 as an optimal rate-distortion cost Min-Rb0 of b0, and the corresponding prediction mode and segmentation manner are used as the optimal prediction mode and segmentation manner of b0.

Sixth operation: Referring to the second operation to the fifth operation, division and prediction mode selections are sequentially performed on b1, b2, and b3, to obtain the respective corresponding optimal prediction modes and rate-distortion costs Min-Rb1, Min-Rb2, and Min-Rb3 respectively, and the sum of Min-Rb0, Min-Rb1, Min-Rb2, and Min-Rb3 is calculated; then by comparing the sum of Min-Rb0, Min-Rb1, Min-Rb2, and Min-Rb3 with Ra, the optimal prediction mode and segmentation manner of the LCU are determined.

The synchronization node refers to a node before performing mode comparison according to the coding results for the associated CUs. For example, before comparing the sum of the rate-distortion costs of d0, d1, d2, and d3 with Rc0, d0, d1, d2, d3, and c0 are required to complete the task. Therefore, d0, d1, d2, and d3 and c0 are associated CUs, and the synchronization node is: comparing the sum of the rate-distortion costs of d0, d1, d2, and d3 with Rc0. In another example, before comparing the sum of the rate-distortion costs of c0, c1, c2, and c3 with Rb0, c0, c1, c2, c3, and b0 are required to complete the task. Therefore, c0, c1, c2, and c3, and b0 are associated CUs, and the synchronization node is: comparing the sum of the rate-distortion costs of c0, c1, c2, and c3 with Rb0.

For example, the task completion moment of four CUs of 8×8 pixels is synchronized with the task completion moment of one CU of 16×16 pixels, so that after the coding of the four 8×8 CU blocks is completed, the four coded 8×8 CU blocks are compared with the coded 16×16 CU block to obtain the optimal mode.

Descriptions are provided below with reference to an exemplary embodiment.

Figure 15:
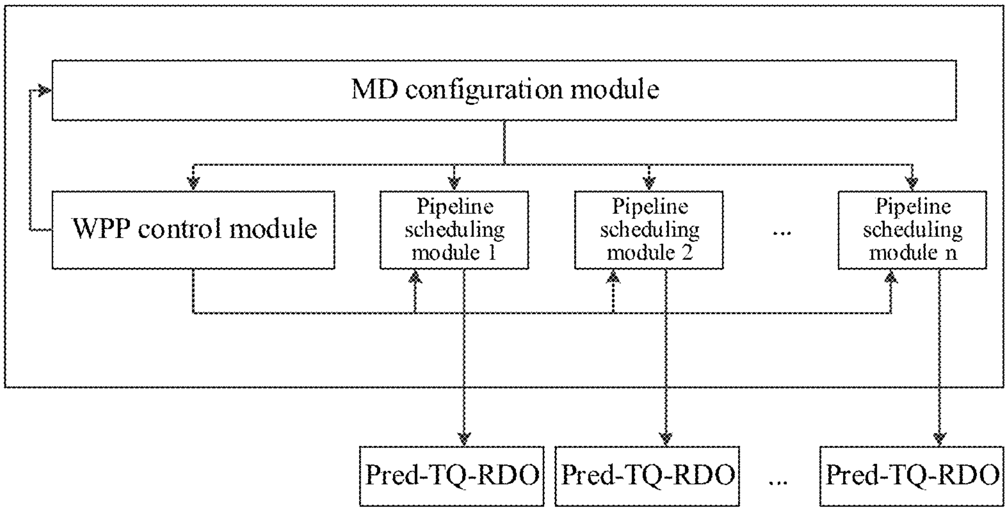
FIG. 15 is a schematic structural diagram of MD according to some embodiments.

FIG. 15 is a schematic architectural diagram of MD according to some embodiments. This architecture includes an MD configuration module, a WPP control module, and pipeline scheduling modules. Each pipeline scheduling module corresponds to one pipeline, and each pipeline includes a set of independent Pred processing resources, TQ processing resources, and RDO processing resources.

The MD control module is configured to configure processing priorities respectively corresponding to the processing resources. The WPP control module may include: a WPP priority scheduling module and a WPP dependency relationship scheduling module. The WPP priority scheduling module is configured to sequentially use each WPP thread to execute the corresponding task according to a calling relationship, and the WPP dependency relationship scheduling module is configured to configure a dependency relationship. Each pipeline scheduling module is configured to execute corresponding tasks based on the Pred processing resources, TQ processing resources, and RDO processing resources in the corresponding pipeline.

After the to-be-processed image is acquired, the block structure is first divided according to the CTU to obtain CUs in the to-be-processed image. Subsequently, pipeline division is performed on the CUs in the to-be-processed image according to CU sizes and the quantity of CU blocks, so that chrominance components and luminance components of the same CU size are divided into the same pipeline. Each pipeline has an independent set of Pred, TQ, and RDO resources for MD calculation. The CU blocks are processed in different pipelines, and in different pipelines, the CU blocks are time-matched at a synchronization node.

As shown in FIG. 11, each pipeline is a three-level pipeline including Pred, TQ, and RDO. In some embodiments, after the CU sets respectively associated with the WPP threads are determined, a corresponding total set of tasks to be executed is obtained for each WPP thread, each task subset including a Pred task, a TQ task, and an RDO task. Subsequently, processing resources respectively corresponding to the tasks included in each total set of tasks are respectively determined based on the Pred resource, the TQ task resource, and the RDO task resource. Subsequently, a scheduling order of the tasks in each total set of tasks is obtained based on the dependency relationships between coding results for the CUs in the to-be-processed image, the scheduling order supporting parallel processing of three WPP threads. Finally, the corresponding WPP threads are called to process the corresponding tasks in the scheduling order based on the processing resources respectively corresponding to the tasks in the total set of tasks, to obtain a coding result for the to-be-processed image.

In some embodiments, 3WPP is started simultaneously to code the CUs. In the coding process, tasks corresponding to independent CUs that have no dependency relationship can be interleaved and executed between dependent CUs.

In some embodiments, the efficient video coding method is used to perform coding tests on a video of 1080 P 2 Mbps bitrate point, and statistics show that the MD single LCU coding speed is twice that of the one-level pipeline solution in the related art that only Pred, TQ, or RDO is processed at the same time. The utilization of the three-level pipeline of Pred, TQ and RDO by using this efficient video coding method is tested simultaneously. The test result is that the Pred utilization can reach 84.47%, the TQ utilization can reach 75.56%, and the RDO utilization can reach 82.94%. It can be seen that the three levels Pred, TQ and RDO all have relatively high pipeline utilization.

Figure 16:
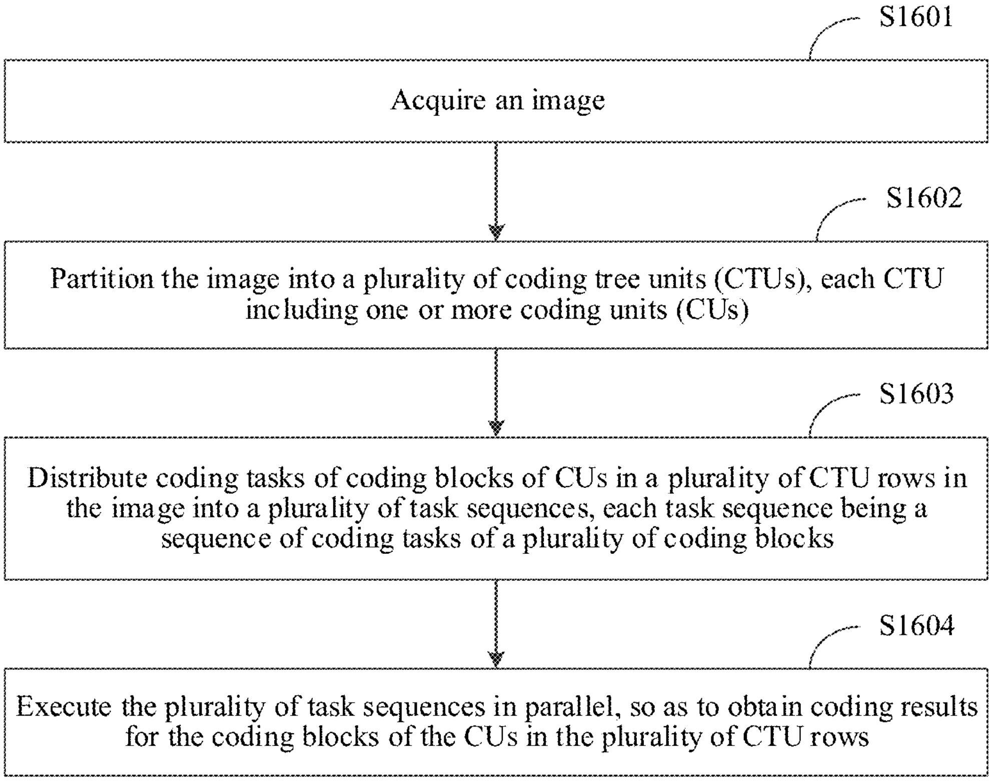
FIG. 16 is a schematic flowchart of a video coding method according to some embodiments.
Figure 17:
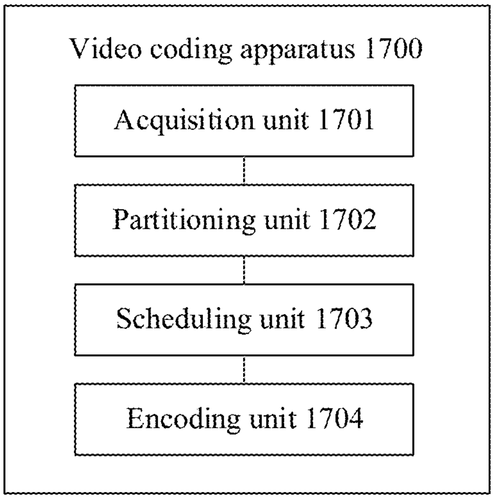
FIG. 17 is a schematic structural diagram of a video coding apparatus according to some embodiments.

FIG. 16 is a flowchart of a video coding method 1600 according to some embodiments. The video coding method 1600 is performed in an electronic device.

Operation S1601: Acquire an image.

Operation S1602: Partition the image into a plurality of CTUs, each CTU including one or more CUs. In some embodiments, the size of the CTU is 64×64 pixels, and the smallest CU is 8×8 pixels. Therefore, the size of a CU may be 8×8 pixels, 16×16 pixels, 32×32 pixels, or 64×64 pixels. In HEVC, a size of an LCU is usually 64×64 pixels. Therefore, in some embodiments, the LCU may be equivalent to the CTU.

Operation S1603: Distribute coding tasks of coding blocks of CUs in a plurality of CTU rows in the image into a plurality of task sequences, each task sequence being a sequence of coding tasks of a plurality of coding blocks. Each task sequence herein can represent the execution order of the coding tasks in the task sequence. In addition, the plurality of task sequences can represent the execution order of all coding tasks in the plurality of task sequences. At the same time point, different coding tasks in different task sequences may be executed in parallel.

Operation S1604: Execute the plurality of task sequences in parallel, so as to obtain coding results for the coding blocks of the CUs in the plurality of CTU rows.

In summary, in some embodiments, coding tasks corresponding to a plurality of CTU rows (or a plurality of LCU rows) can be generally divided into a plurality of task sequences that are executed in parallel, rather than coding only a single CTU at a time, thereby improving the coding efficiency.

In some embodiments, the size of a CTU (or an LCU) is 64×64 pixels, the maximum coding depth is 3, and the minimum segmentation unit is 8×8 pixels. In order to determine the optimal division mode of a CTU (or an LCU), it is necessary to traverse the segmentation from 64×64 pixels to 8×8 pixels, and determine the optimal segmentation manner of the LCU by calculating the rate-distortion cost. Therefore, one CTU may include 85 CUs. The 85 CUs include: one CU of 64×64 pixels, four CUs of 32×32 pixels, 16 CUs of 16×16 pixels, and 64 CUs of 8×8 pixels.

In some embodiments, the distributing coding tasks of coding blocks of CUs in a plurality of CTU rows in the image into a plurality of task sequences includes:

distributing the coding tasks of the coding blocks of the CUs in the plurality of CTU rows into the plurality of task sequences based on coding dependency relationships between the coding blocks of the CUs in the plurality of CTU rows. In this way, in some embodiments, the task sequences are determined according to the coding dependency relationships, so that the process of executing coding tasks in parallel in some embodiments can meet the coding dependency relationships between the coding tasks, so as to ensure the normal progress of the coding. In some embodiments, the plurality of coding blocks corresponding to each task sequence have a same coding block size or correspond to a same CU size.

the distributing coding tasks of coding blocks of CUs in a plurality of CTU rows in the image into a plurality of task sequences includes:

distributing the coding tasks of the coding blocks of the CUs in the plurality of CTU rows in the image into a plurality of task sequences according to coding block sizes or CU sizes. For example, for a coding block size of 32×32, luminance coding blocks and chrominance coding blocks of 32×32 in the CUs in the plurality of CTU rows may be divided into the same task sequence in this application. In another example, for a CU size of 32×32, the luminance coding blocks (size of 32×32) and chrominance coding blocks (size of 16×16) of the CUs of 32×32 pixels in the CUs in the plurality of CTU rows may be divided into the same task sequence in this application.

In some embodiments, the distributing the coding tasks of the coding blocks of the CUs in the plurality of CTU rows in the image into a plurality of task sequences according to coding block sizes or CU sizes includes:

distributing the coding tasks of the coding blocks of the CUs in the plurality of CTU rows in the image into a plurality of groups according to coding block sizes or CU sizes; and sorting coding tasks in each of the plurality of groups into a corresponding task sequence based on coding dependency relationships between the coding blocks of the CUs in the plurality of CTU rows. For example, the coding tasks of the coding blocks with the same coding block size in the plurality of CTU rows in the image are distributed to the same task sequence, to obtain the plurality of task sequences; or the tasks of the coding blocks of the CUs with the same CU size in the plurality of CTU rows in the image are distributed to the same task sequence to obtain the plurality of task sequences.

In some embodiments, at the CTU (LCU) level, the plurality of CTU rows in the image may be processed in parallel in the WPP manner of the embodiment of FIG. 13. That is, the processing progress of any two adjacent CTU rows differs by two CTUs. In some embodiments, for two adjacent CTU rows, the processing progress of the upper CTU row is two CTUs ahead of that of the lower CTU row. Further, for a plurality of CTUs processed in parallel (for example, the plurality of CTUs processed in parallel are from different CTU rows), the coding tasks of the coding blocks of all CUs corresponding to the plurality of CTUs may be distributed into a plurality of task sequences at the CU level in some embodiments. In this way, at the CTU level, the plurality of CTU rows may be processed in a WPP manner in some embodiments. At the CU level, the coding tasks of the coding blocks of the CUs in the plurality of CTUs executed in parallel are processed according to a plurality of parallel task sequences.

In some embodiments, coding blocks of each CU include one luminance coding block and two chrominance coding blocks, a size of each of the two chrominance coding blocks being smaller than that of the luminance coding block.

The coding dependency relationships between the coding blocks of the CUs in the plurality of CTU rows include at least one of the following:

a first dependency relationship, configured for indicating that: for two CUs adjacent to each other left and right in the image, coding of a luminance coding block of the right CU depends on a coding result for a luminance coding block of the left CU;

a second dependency relationship, configured for indicating that: for two CUs adjacent to each other left and right in the image, coding of a luminance coding block of the right CU depends on coding results for chrominance coding blocks of the left CU; or a third dependency relationship, configured for indicating that: coding of chrominance coding blocks of each CU in the image depends on a coding result for a luminance coding block of the each CU. For details of the first, second, and third dependency relationships, reference may be made to the embodiments of FIG. 12A to FIG. 12C above.

In some embodiments, the sorting coding tasks in each of the plurality of groups into a corresponding task sequence based on coding dependency relationships between the coding blocks of the CUs in the plurality of CTU rows includes at least one of the following:

for two CUs adjacent to each other left and right in the image, distributing an execution order of a coding task of a luminance coding block of the right CU to be later than that of a coding task of a luminance coding block of the left CU according to the first dependency relationship;

for two CUs adjacent to each other left and right in the image, distributing an execution order of a coding task of a luminance coding block of the right CU to be later than those of coding tasks of chrominance coding blocks of the left CU according to the second dependency relationship; or distributing execution orders of coding tasks of chrominance coding blocks of each CU in the image to be later than that of a coding task of a luminance coding block of the each CU according to the third dependency relationship. In this way, in some embodiments, an overall arrangement on the coding tasks corresponding to the plurality of CTU rows can be made, so that the coding tasks corresponding to the plurality of CTU rows can be executed in parallel on the premise of ensuring the coding dependency relationships, thereby improving the coding efficiency.

In some embodiments, the method further includes the following operations: acquiring a plurality of pipelines, each pipeline including at least one level of processing resources for coding, different levels of processing resources being configured to process different types of coding tasks; and the distributing coding tasks of coding blocks of CUs in a plurality of CTU rows in the image into a plurality of task sequences includes:

distributing the coding tasks of the coding blocks of the CUs in the plurality of CTU rows in the image to the plurality of pipelines, to obtain a task sequence of each pipeline.

In some embodiments, each pipeline includes three levels of processing resources, a first level of processing resources being configured to perform prediction (Pred) processing related to a coding mode, a second level of processing resources being configured to perform transform and quantization (TQ) processing, a third level of processing resources being configured to perform rate distortion optimization (RDO) processing, and a coding task of each coding block of each CU includes a Pred processing task (that is, the Pred task above), a TQ processing task (that is, the TQ task), and an RDO processing task (that is, the RDO task) for the corresponding coding block. Each coding block of some embodiments is processed in sequence by processing resources at each level in the pipeline, that is, each coding block performs Pred processing, TQ processing, and RDO processing in sequence. In addition, in some embodiments, processing resources at different levels in the pipeline may process coding tasks of different coding blocks at the same time point respectively, without waiting for execution of the three coding tasks of the same coding block to be completed before executing the coding task corresponding to another coding block. In this way, some embodiments can improve the utilization of processing resources and improve the coding efficiency.

In some embodiments, the acquiring a plurality of pipelines includes:

generating a corresponding pipeline for each of a plurality of CU sizes; or generating a corresponding pipeline for each of a plurality of coding block sizes.

Therefore, in some embodiments, a pipeline may be established according to the CU size or the coding block size. That is, the CU size is associated with the selection of the pipeline. The CU size (coding block size) is proportional to the processing resources (such as an internal memory and a CPU) of pipeline classification.

In some embodiments, different pipelines in the plurality of pipelines correspond to different CU sizes; and the distributing the coding tasks of the coding blocks of the CUs in the plurality of CTU rows in the image to the plurality of pipelines, to obtain a task sequence of each pipeline includes:

distributing, based on respective sizes of the CUs in the plurality of CTU rows, the coding tasks of the coding blocks of the CUs in the plurality of CTU rows to pipelines corresponding to corresponding CU sizes; and determining, based on coding dependency relationships between the coding blocks of the CUs in the plurality of CTU rows, execution orders of coding tasks distributed to the pipelines, to obtain a task sequence of each pipeline.

In this way, in this application, coding blocks of CUs may be divided into pipelines matching CU sizes according to different CU sizes, so that coding tasks of coding blocks of CUs of different CU sizes can be processed in parallel on the premise of meeting the coding dependency relationships, thereby improving the coding efficiency.

In some embodiments, different pipelines in the plurality of pipelines correspond to different coding block sizes; and the distributing the coding tasks of the coding blocks of the CUs in the plurality of CTU rows in the image to the plurality of pipelines, to obtain a task sequence of each pipeline includes:

distributing, based on sizes of the coding blocks of the CUs in the plurality of CTU rows, the coding tasks of the coding blocks of the CUs in the plurality of CTU rows to pipelines corresponding to corresponding coding block sizes; and determining, based on coding dependency relationships between the coding blocks of the CUs in the plurality of CTU rows, execution orders of coding tasks distributed to the pipelines, to obtain a task sequence of each pipeline.

Because the coding blocks are distributed to the corresponding pipelines according to sizes of the coding blocks, the luminance and chrominance coding blocks of the same CU will be distributed to different pipelines. In this way, the coding task of the luminance coding block and the coding tasks of the chrominance coding blocks of the same CU in some embodiments can be processed in parallel in different pipelines, thereby improving the coding efficiency of the CU.

Some embodiments may further include: creating a plurality of threads; and associating a thread for each CTU row, each coding task in each task sequence being executed by a thread associated with a CTU row at which the corresponding coding block is located.

The thread herein is, for example, a WPP thread. When executing a coding task of a coding block, the thread can use the processing resources in the pipeline associated with the task sequence at which the coding task is located to execute the coding task.

Based on the same inventive concept, some embodiments provide a video coding apparatus. FIG. 16 is a schematic structural diagram of a video coding apparatus 1700. The apparatus 1700 may include:

an acquisition unit 1701, configured to acquire an image;

a partitioning unit 1702, configured to partition the image into a plurality of CTUs, each CTU including one or more CUs;

a scheduling unit 1703, configured to distribute coding tasks of coding blocks of CUs in a plurality of CTU rows in the image into a plurality of task sequences, each task sequence being a sequence of coding tasks of a plurality of coding blocks; and an encoding unit 1704, configured to execute the plurality of task sequences in parallel, so as to obtain coding results for the coding blocks of the CUs in the plurality of CTU rows.

For more specific implementation of the apparatus 1700, reference may be made to the method 1600, and details are not described herein again.

For ease of description, the foregoing components are respectively described as various modules (or units) divided according to functions. Certainly, during implementation of this application, the functions of the modules (or units) may be implemented in one or more pieces of software or hardware.

Specific request execution manners of the units in the apparatus in the foregoing embodiment have been described in detail in the embodiment about the method, and details will not be described herein again.

A person skilled in the art can understand that various aspects may be implemented as systems, methods, or computer program products. Therefore, each aspect of various embodiments may be implemented in the following forms, that is, the implementation form of complete hardware, complete software (including firmware and micro code), or a combination of hardware and software, which may be uniformly referred to as “circuit”, “module”, or “system” herein.

In some embodiments, the term “module” or “unit” refers to a computer program or a part of a computer program that has a predetermined function and works together with other related parts to achieve a predetermined goal, and may be implemented in whole or in part by using software, hardware (such as a processing circuit or a memory) or a combination thereof. Similarly, one processor (or a plurality of processors or memories) may be used to implement one or more modules or units. In addition, each module or unit may be a part of an integral module or unit that includes the function of the module or unit.

Figure 18:
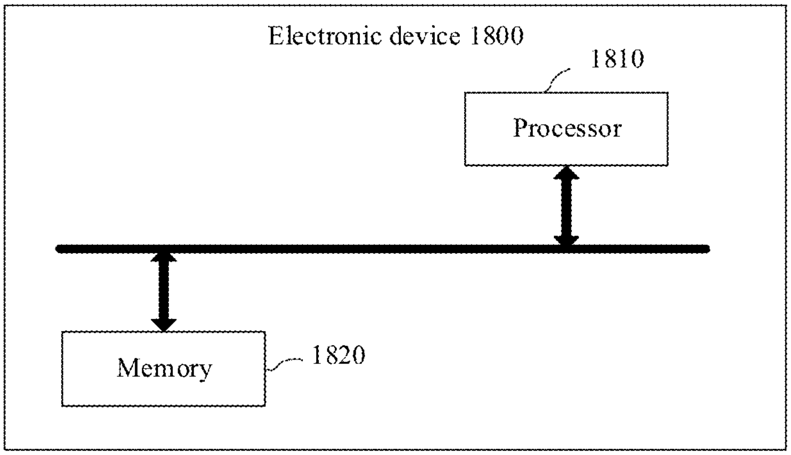
FIG. 18 is a schematic structural diagram of an electronic device according to some embodiments.

Some embodiments further provide an electronic device. In an embodiment, the electronic device may be a server or a terminal device. FIG. 18 is a schematic structural diagram of a possible electronic device according to some embodiments. In FIG. 18, the electronic device 1800 includes: a processor 1810 and a memory 1820.

The memory 1820 stores a computer program that can be executed by the processor 1810. The processor 1810 can perform the operations of the foregoing video coding method by executing the instructions stored in the memory 1820.

The memory 1820 may be a volatile memory, such as a random-access memory (RAM). The memory 1820 may alternatively be a non-volatile memory, such as a read-only memory (ROM), a flash memory, a hard disk drive (HDD), or a solid-state drive (SSD). Alternatively, the memory 1820 is any other medium that may be used for carrying or storing expected program code having an instruction or data structure form, and that may be accessed by a computer, but is not limited thereto. The memory 1820 may alternatively be a combination of the foregoing memories.

The processor 1810 may include one or more central processing units (CPUs), or may be a digital processing unit, or the like. The processor 1810 is configured to implement the foregoing video coding method when executing the computer program stored in the memory 1820.

In some embodiments, the processor 1810 and the memory 1820 may be implemented in the same chip. In some embodiments, they may be separately implemented in independent chips.

In some embodiments, a specific connection medium between the processor 1810 and the memory 1820 is not limited. In some embodiments, the processor 1810 and the memory 1820 being connected by a bus is used as an example. The bus is described by using a bold line in FIG. 18, and a connection manner between other components is merely described as an example, and is not limited thereto. The bus may be classified into an address bus, a data bus, a control bus, or the like. For ease of description, the bus in FIG. 18 is described by using only one bold line, but it does not indicate that there is only one bus or one type of bus.

Some embodiments provide a computer-readable storage medium, including a computer program. When the computer program is run on an electronic device, the computer program is configured to cause the electronic device to perform the operations of the foregoing video coding method. In some possible implementations, each aspect of the video coding method provided in this application may be further implemented in a form of a program product including a computer program. When the program product is run on an electronic device, the computer program is configured to cause the electronic device to perform operations of the foregoing video coding method. For example, the electronic device can perform the operations shown in FIG. 5 to FIG. 16.

The program product may use any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a portable compact disk read only memory (CD-ROM), an optical storage device, a magnetic storage device, or any appropriate combination thereof.

The program product in the implementation of this application may use a CD-ROM and includes a computer program, and may be run on an electronic device. However, the program product of this application is not limited to this. In some embodiments, the readable storage medium may be any tangible medium including or storing a computer program, and the computer program may be used by or in combination with a command execution system, apparatus, or device.

The readable signal medium may include a data signal propagated in a baseband or as part of a carrier, the data signal carrying a readable computer program. The propagated data signal may be in a plurality of forms, including but not limited to, an electromagnetic signal, an optical signal, or any appropriate combination thereof. The readable signal medium may alternatively be any readable medium other than the readable storage medium. The readable medium may transmit, propagate, or transmit a computer program configured to be used by or in combination with a command execution system, apparatus, or device.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A video coding method, performed by an electronic device, comprising:

acquiring an image;

partitioning the image into a plurality of coding tree units (CTUs), each CTU comprising one or more coding units (CUs);

acquiring a plurality of pipelines, each of the plurality of pipelines comprising at least one level of processing resources for coding, different levels of the processing resources being configured to process different types of coding tasks;

distributing, based on sizes of coding blocks of the CUs in the plurality of CTU rows, the coding tasks of the coding blocks of the CUs in the plurality of CTU rows in the image into the plurality of pipelines to obtain a plurality of task sequences, each of the plurality of task sequences being a sequence of the coding tasks of the coding blocks, wherein luminance coding blocks and chrominance coding blocks of the CUs are distributed to different pipelines of the plurality of pipelines; and executing the plurality of task sequences in parallel, so as to obtain coding results for the coding blocks of the CUs in the plurality of CTU rows.

2. The video coding method according to claim 1, wherein the plurality of coding blocks corresponding to each of the plurality of task sequences have a same coding block size or correspond to a same CU size; and the distributing comprises:

distributing the coding tasks of the coding blocks of the CUs in the plurality of CTU rows in the image into the plurality of task sequences according to coding block sizes or CU sizes.

3. The video coding method according to claim 2, wherein the distributing the coding tasks of the coding blocks of the CUs in the plurality of CTU rows in the image into the plurality of task sequences according to coding block sizes or CU sizes comprises:

distributing the coding tasks of the coding blocks of the CUs in the plurality of CTU rows in the image into a plurality of groups according to coding block sizes or CU sizes; and sorting coding tasks in each of the plurality of groups into a corresponding task sequence based on the coding dependency relationships between the coding blocks of the CUs in the plurality of CTU rows.

4. The video coding method according to claim 3, wherein coding blocks of each CU comprise a luminance coding block and two chrominance coding blocks, a size of each of the two chrominance coding blocks being smaller than that of the luminance coding block; and wherein the coding dependency relationships between the coding blocks of the CUs in the plurality of CTU rows comprise at least one of the following:

a first dependency relationship, configured for indicating that: for two CUs adjacent to each other left and right in the image, coding of a luminance coding block of the right CU depends on a coding result for a luminance coding block of the left CU;

a second dependency relationship, configured for indicating that: for two CUs adjacent to each other left and right in the image, coding of a luminance coding block of the right CU depends on coding results for chrominance coding blocks of the left CU; or a third dependency relationship, configured for indicating that: coding of chrominance coding blocks of each CU in the image depends on a coding result for a luminance coding block of the each CU.

5. The video coding method according to claim 4, wherein the sorting comprises at least one of the following:

for two CUs adjacent to each other left and right in the image, distributing an execution order of a coding task of a luminance coding block of the right CU to be later than that of a coding task of a luminance coding block of the left CU according to the first dependency relationship; and for two CUs adjacent to each other left and right in the image, distributing an execution order of a coding task of a luminance coding block of the right CU to be later than those of coding tasks of chrominance coding blocks of the left CU according to the second dependency relationship; or distributing execution orders of coding tasks of chrominance coding blocks of each CU in the image to be later than that of a coding task of a luminance coding block of the each CU according to the third dependency relationship.

6. The video coding method according to claim 1, wherein each pipeline comprises three levels of processing resources, a first level of processing resources being configured to perform prediction (Pred) processing related to a coding mode, a second level of processing resources being configured to perform transform and quantization (TQ) processing, a third level of processing resources being configured to perform rate distortion optimization (RDO) processing, and a coding task of each coding block of each CU comprises a Pred processing task, a TQ processing task, and an RDO processing task for a corresponding coding block.

7. The video coding method according to claim 1, wherein the acquiring the plurality of pipelines comprises:

generating a corresponding pipeline for each of a plurality of CU sizes; or generating a corresponding pipeline for each of a plurality of coding block sizes.

8. The video coding method according to claim 1, further comprising:

creating a plurality of threads; and associating a thread for each CTU row, each coding task in each task sequence of the plurality of task sequences being executed by a thread associated with a CTU row at which a corresponding coding block is located.

9. A video coding apparatus, comprising:

at least one processor; and at least one memory storing instructions, wherein the instructions, when executed by the at least one processor, cause the video coding apparatus to:

acquire an image;

partition the image into a plurality of coding tree units (CTUs), each CTU comprising one or more coding units (CUs);

acquire a plurality of pipelines, each of the plurality of pipelines comprising at least one level of processing resources for coding, different levels of the processing resources being configured to process different types of coding tasks;

distribute, based on sizes of coding blocks of the CUs in a plurality of CTU rows, the coding tasks of the coding blocks of the CUs in the plurality of CTU rows in the image into the plurality of pipelines to obtain a plurality of task sequences, each of the plurality of task sequences being a sequence of the coding tasks of the coding blocks, wherein luminance coding blocks and chrominance coding blocks of the CUs are distributed to different pipelines of the plurality of pipelines; and execute the plurality of task sequences in parallel, so as to obtain coding results for the coding blocks of the CUs in the plurality of CTU rows.

10. The video coding apparatus according to claim 9, wherein the plurality of coding blocks corresponding to each task sequence of the plurality of task sequences have a same coding block size or correspond to a same CU size; and wherein the instructions, when executed by the at least one processor, further cause the video coding apparatus to:

distribute the coding tasks of the coding blocks of the CUs in the plurality of CTU rows in the image into the plurality of task sequences according to coding block sizes or CU sizes.

11. The video coding apparatus according to claim 10, wherein the instructions, when executed by the at least one processor, further cause the video coding apparatus to:

distribute the coding tasks of the coding blocks of the CUs in the plurality of CTU rows in the image into a plurality of groups according to coding block sizes or CU sizes; and sort coding tasks in each of the plurality of groups into a corresponding task sequence based on the coding dependency relationships between the coding blocks of the CUs in the plurality of CTU rows.

12. The video coding apparatus according to claim 11, wherein coding blocks of each CU comprise one luminance coding block and two chrominance coding blocks, a size of each of the two chrominance coding blocks being smaller than that of the luminance coding block; and wherein the coding dependency relationships between the coding blocks of the CUs in the plurality of CTU rows comprise at least one of the following:

a first dependency relationship, configured for indicating that: for two CUs adjacent to each other left and right in the image, coding of a luminance coding block of the right CU depends on a coding result for a luminance coding block of the left CU;

a second dependency relationship, configured for indicating that: for two CUs adjacent to each other left and right in the image, coding of a luminance coding block of the right CU depends on coding results for chrominance coding blocks of the left CU; or a third dependency relationship, configured for indicating that: coding of chrominance coding blocks of each CU in the image depends on a coding result for a luminance coding block of the each CU.

13. The video coding apparatus according to claim 12, wherein the instructions, when executed by the at least one processor, further cause the video coding apparatus to:

for two CUs adjacent to each other left and right in the image, distribute an execution order of a coding task of a luminance coding block of the right CU to be later than that of a coding task of a luminance coding block of the left CU according to the first dependency relationship; and for two CUs adjacent to each other left and right in the image, distribute an execution order of a coding task of a luminance coding block of the right CU to be later than those of coding tasks of chrominance coding blocks of the left CU according to the second dependency relationship; or distribute execution orders of coding tasks of chrominance coding blocks of each CU in the image to be later than that of a coding task of a luminance coding block of the each CU according to the third dependency relationship.

14. The video coding apparatus according to claim 9, wherein each pipeline comprises three levels of processing resources, a first level of processing resources being configured to perform prediction (Pred) processing related to a coding mode, a second level of processing resources being configured to perform transform and quantization (TQ) processing, a third level of processing resources being configured to perform rate distortion optimization (RDO) processing, and a coding task of each coding block of each CU comprises a Pred processing task, a TQ processing task, and an RDO processing task for a corresponding coding block.

15. The video coding apparatus according to claim 9, wherein the instructions, when executed by the at least one processor, further cause the video coding apparatus to:

generate a corresponding pipeline for each of a plurality of CU sizes; or generate a corresponding pipeline for each of a plurality of coding block sizes.

16. A non-transitory computer-readable storage medium, storing computer code which, when executed by at least one processor, causes the at least one processor to at least:

acquire an image;

partition the image into a plurality of coding tree units (CTUs), each CTU comprising one or more coding units (CUs);

acquire a plurality of pipelines, each of the plurality of pipelines comprising at least one level of processing resources for coding, different levels of the processing resources being configured to process different types of coding tasks;

distribute, based on sizes of coding blocks of the CUs in the plurality of CTU rows, the coding tasks of the coding blocks of the CUs in the plurality of CTU rows in the image into the plurality of pipelines to obtain a plurality of task sequences, each of the plurality of task sequences being a sequence of the coding tasks of the coding blocks, wherein luminance coding blocks and chrominance coding blocks of the CUs are distributed to different pipelines of the plurality of pipelines; and execute the plurality of task sequences in parallel, so as to obtain coding results for the coding blocks of the CUs in the plurality of CTU rows.

* * * * *